US008650939B2

(12) United States Patent
Matsumiya et al.

(10) Patent No.: US 8,650,939 B2
(45) Date of Patent: Feb. 18, 2014

(54) SURFACE TEXTURE MEASURING MACHINE AND A SURFACE TEXTURE MEASURING METHOD

(75) Inventors: Sadayuki Matsumiya, Kawasaki (JP); Yoshiyuki Omori, Kure (JP); Sadaharu Arita, Kure (JP); Kotaro Hirano, Kawasaki (JP); Yasushi Fukumoto, Kawasaki (JP); Koichi Komatsu, Kawasaki (JP); Fumihiro Takemura, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 523 days.

(21) Appl. No.: 12/900,867

(22) Filed: Oct. 8, 2010

(65) Prior Publication Data

US 2011/0083497 A1    Apr. 14, 2011

(30) Foreign Application Priority Data

Oct. 13, 2009  (JP) ................. 2009-236121
Oct. 13, 2009  (JP) ................. 2009-236123
Oct. 13, 2009  (JP) ................. 2009-236124
Oct. 13, 2009  (JP) ................. 2009-236125

(51) Int. Cl.
*G01B 5/20* (2006.01)
*G01B 11/24* (2006.01)
*G01B 21/04* (2006.01)

(52) U.S. Cl.
USPC ............................................. 73/105; 73/104

(58) Field of Classification Search
USPC ................................................. 73/104, 105
See application file for complete search history.

(56) References Cited

U.S. PATENT DOCUMENTS

| 4,731,934 | A | 3/1988 | Barnaby et al. |
| 4,908,951 | A | 3/1990 | Gurny |
| 5,253,429 | A | 10/1993 | Konno et al. |
| 5,955,661 | A | 9/1999 | Samsavar et al. |
| 6,067,165 | A | 5/2000 | Matsumiya et al. |
| 6,745,616 | B1 | 6/2004 | Katayama et al. |
| 7,170,048 | B2 * | 1/2007 | Kakemizu ............. 250/234 |

(Continued)

FOREIGN PATENT DOCUMENTS

DE   10 2006 014 509 A1   9/2007
JP       A-62-265520      11/1987

(Continued)

OTHER PUBLICATIONS

Search Report issued in European Patent Application No. 10187326.3 dated May 25, 2011.

(Continued)

*Primary Examiner* — Daniel S Larkin
(74) *Attorney, Agent, or Firm* — Oliff PLC

(57) ABSTRACT

A surface texture measuring machine includes: a stage, a contact-type detector having a stylus, an image probe, a relative movement mechanism and a controller. The controller includes: a center position calculating unit that, when the image probe enters position data of at least three points on a circular contour of a circular concave portion or a circular convex portion of an object, approximates the entered position data to a circle to obtain a center position of the circle; and a stylus setting unit that, after calculating the center position, operates the relative movement mechanism to position the stylus of the contact-type detector at the center position.

4 Claims, 29 Drawing Sheets

(56) References Cited

U.S. PATENT DOCUMENTS

| | | | |
|---|---|---|---|
| 2005/0012936 A1* | 1/2005 | Murayama et al. | 356/601 |
| 2005/0068523 A1 | 3/2005 | Wang et al. | |
| 2005/0151963 A1 | 7/2005 | Pulla et al. | |
| 2009/0012743 A1 | 1/2009 | McDonnell et al. | |
| 2009/0024355 A1* | 1/2009 | Negishi | 702/168 |
| 2009/0299692 A1* | 12/2009 | Yoshizumi et al. | 702/168 |
| 2011/0000277 A1* | 1/2011 | MacManus | 73/1.79 |

FOREIGN PATENT DOCUMENTS

| | | |
|---|---|---|
| JP | A-62-272186 | 11/1987 |
| JP | A-01-298479 | 12/1989 |
| JP | B2-4-78929 | 12/1992 |
| JP | A-5-87562 | 4/1993 |
| JP | A-06-161533 | 6/1994 |
| JP | A-07-505958 | 6/1995 |
| JP | A-10-062155 | 3/1998 |
| JP | B2-2794258 | 6/1998 |
| JP | A-11-351858 | 12/1999 |
| JP | A-2000-266534 | 9/2000 |
| JP | A-2001-108863 | 4/2001 |
| JP | A-2003-097939 | 4/2003 |
| JP | B2-3482362 | 10/2003 |
| JP | A-2004-093190 | 3/2004 |
| JP | B2-3602965 | 10/2004 |
| JP | B2-3612068 | 10/2004 |
| JP | B2-3678915 | 5/2005 |
| JP | B2-3678916 | 5/2005 |
| JP | A-2005-167146 | 6/2005 |
| JP | A-2005-346586 | 12/2005 |
| JP | A-2007-114000 | 5/2007 |
| JP | A-2007-198791 | 8/2007 |
| JP | A-2008-524565 | 7/2008 |
| JP | A-2009-150835 | 7/2009 |
| WO | WO 2007/107324 * | 9/2007 |

OTHER PUBLICATIONS

Partial European Search Report issued in Application No. 10 18 7326.3; Dated Feb. 3, 2011.
U.S. Appl. No. 12/900,788, filed Oct. 8, 2010 in the name of Yasushi Fukumoto.
U.S. Appl. No. 12/900,834, filed Oct. 8, 2010 in the name of Tomotaka Takahashi.
May 21, 2013 Office Action issued in Japanese Patent Application No. 2009-236121 (w/ English Translation).
May 28, 2013 Office Action issued in Japanese Patent Application No. 2009-236123 (w/ English Translation).
May 28, 2013 Office Action issued in Japanese Patent Application No. 2009-236125 (w/ English Translation).
Aug. 20, 2013 Office Action issued in Japanese Patent Application No. 2009-236124 (with English translation).
Aug. 20, 2013 Office Action issued in Japanese Patent Application No. 2009-236125 (with English translation).

* cited by examiner

SURFACE TEXTURE MEASURING MACHINE AND A SURFACE TEXTURE MEASURING METHOD

The entire disclosure of Japanese Patent Applications No. 2009-236121 filed Oct. 13, 2009, No. 2009-236123 filed Oct. 13, 2009, No. 2009-236124 filed Oct. 13, 2009, and No. 2009-236125 filed Oct. 13, 2009, are expressly incorporated by reference herein.

BACKGROUND OF THE INVENTION

1. Field of the Invention

The present invention relates to a surface texture measuring machine for measuring surface profiles, surface roughness and the like of an object to be measured and a surface texture measuring method. Specifically, the present invention relates to a surface texture measuring machine including a contact-type detector provided with a stylus and an image probe, and a surface texture measuring method.

2. Description of Related Art

There has been known a surface texture measuring machine in which a stylus is moved along a surface of an object while being in contact with the surface of the object. A displacement of the stylus due to a surface profile or surface roughness of the object is detected, thereby measuring the surface profile, surface roughness and the like of the object based on the displacement of the stylus (see, for instance, Patent Literature: JP-A-05-087562).

In such a typical surface texture measuring machine, in order to measure the surface profile, surface roughness and the like of the object, while visually checking and adjusting a relative position between a tip end of a stylus and a measurement area on the object, an operator sets the tip end of the stylus at a measurement starting position on the object and then moves the stylus along the surface of the object. A surface texture such as the surface profile and the surface roughness of the object is measured based on a vertical displacement of the stylus due to the surface profile, surface roughness and the like of the object.

Moreover, in the surface texture measuring machine, when an attitude of the object is inclined relative to a measurement axis in measuring a surface of the object, a measurement result may have an error. For instance, when an attitude of a cylinder is inclined relative to a measurement axis in measuring an axial texture of a surface of the cylinder, a stylus is displaced in an outer circumferential direction of the cylinder as well as in an axial direction of the cylinder while the stylus is moved along the measurement axis. For this reason, a measurement value includes a value showing an outer circumferential texture of the cylinder as well as a value showing an axial concavity and convexity of the surface of the cylinder, so that the measurement result has an error. Moreover, in the surface texture measuring machine, when a to-be-measured surface is inclined relative to a horizontal plane, the measurement result may also have an error.

Accordingly, there has been developed a surface texture measuring machine that performs a preliminary measurement of an object with a stylus before an actual measurement and adjusts an attitude of the object, for instance, in parallel to a measurement axis based on a result of the preliminary measurement (for instance, Patent Literature 2: JP-A-2000-266534). The surface texture measuring machine of Patent Literature 2 includes a turntable that rotates the object on a horizontal plane. The surface texture measuring machine rotates the turntable based on the result of the preliminary measurement performed with the stylus and adjusts the attitude of the object in parallel to the measurement axis (so-called alignment).

Also, the surface texture measuring machine of Patent Literature 2 includes a leveling table that inclines the object relative to the horizontal plane. The surface texture measuring machine inclines the leveling table based on the result of the preliminary measurement performed with the stylus and adjusts the attitude of the object so that the to-be-measured surface thereof is horizontal (so-called leveling).

Due to a recent tendency for measuring minute and thin objects, objects or measuring spots are downsized. Accordingly, the above setting operation of a stylus, which is quite complicated and requires a long time, places a large burden on the operator.

In addition, some types of objects may interfere with (collide with) a stylus to damage the stylus or the objects.

Particularly, as shown in FIGS. 18A to 18C, in measuring a radius or diameter of each of a plurality of microlens molding surfaces 72 having convexity (or concavity) of 1 mm or less diameter that are formed on a microlens array mold 71, the stylus must correctly trace a center line where vertexes (peak or bottom points) of the microlens molding surfaces 72 are located in order to obtain a correct measurement result.

In order to measure such an object, as shown in FIGS. 19A to 19C, in a typical measurement, the operator is required to position a tip end of a stylus 24 on the microlens molding surface 72 while visually checking a relative position between the tip end of the stylus 24 and the microlens molding surface 72 (see FIG. 19A), to move a stage on which the microlens array mold 71 (the object) is mounted (see FIG. 19B), to detect the vertex of the microlens molding surface 72 (see FIG. 19C), and to relatively move the stylus 24 so as to trace the center line of the microlens molding surface 72.

For this reason, in a typical operation, a setting time of the stylus is extremely longer than a measuring time (for instance, the measuring time is approximately 10 seconds and the setting time is approximately 120 seconds).

Moreover, in the surface texture measuring machine of Patent Literature 2, it takes extremely long time for the preliminary measurement because the preliminary measurement requires many steps and uses the stylus for measuring the surface of the object. Further, the object may be damaged by the stylus.

SUMMARY OF THE INVENTION

An object of the invention is to provide a surface texture measuring machine for shortening a setting time of a stylus and a surface texture measuring method for the same.

Another object of the invention is to provide a surface texture measuring machine for shortening a time in a preliminary measurement and not damaging an object in the preliminary measurement.

According to an aspect of the invention, a surface texture measuring machine for measuring a surface texture of an object includes: a stage on which an object is mounted; a contact-type detector having a stylus that is brought into contact with a surface of the object; an image probe that captures an image of the surface of the object; a relative movement mechanism that relatively moves the stage against the contact-type detector and the image probe and/or relatively moves the contact-type detector and the image probe against the stage; and a controller that controls a drive of the relative movement mechanism and executes processing on measurement data obtained by the contact-type detector and image data captured by the image probe, in which the controller includes: a center position calculating unit that, when the image probe enters position data of at least three points on a circular contour of a circular concave portion or a circular convex portion of the object, approximates the entered position data to a circle to obtain a center position of the circle; and a stylus setting unit that, when the center position calculating unit obtains the center position, operates the relative movement mechanism to position a stylus of the contact-type detector at the center position.

With this arrangement, firstly, an operator operates the relative movement mechanism and acquires the position data of at least three points on the circular contour of the circular concave portion or the circular convex portion of the object by using the image probe.

Then, the controller approximates the inputted position data to a circle to obtain the center position of the circle (a center position calculating unit) and operates the relative movement mechanism to position the stylus of the contact-type detector at the center position (a stylus setting unit).

Accordingly, the stylus of the contact-type detector can be automatically set at the center position of the circular concave portion or the circular convex portion of the object. In other words, the operator does not have to position the tip end of the stylus on a microlens molding surface while visually checking and adjusting the position of the tip end of the stylus relative to the microlens molding surface as in a typical apparatus, thereby shortening the setting time of the stylus.

In the surface texture measuring machine according to the aspect of the invention, one of the stylus of the contact-type detector and the image probe is located at an offset position not to interfere with the other of the stylus of the contact-type detector and the image probe which is to be measured, the surface texture measuring machine further including an offset amount storage unit that stores an offset amount of a tip end of the stylus of the contact-type detector and the image probe, and when the center position is obtained by the center position calculating unit, the stylus setting unit operates the relative movement mechanism to position the image probe at the center position and then operates the relative movement mechanism by the offset amount stored in the offset amount storage unit to position the stylus of the contact-type detector at the center position.

With this arrangement, since one of the stylus of the contact-type detector and the image probe is located at an offset position not to interfere with the other of the stylus and the image probe that is used for the measurement, the measurement is not affected even without providing a mechanism for evacuating one of the stylus and the image probe that is not used for the measurement.

Further, the offset amounts between the tip end of the stylus of the contact-type detector and the image probe are stored in the offset amount storage unit. Accordingly, by moving the relative movement mechanism by the offset amounts stored in the offset amount storage unit after calculating the center position of the circular concave portion or the circular convex portion and positioning the image probe at the center position by operating the relative movement mechanism, the stylus of the contact-type detector can be automatically positioned at the center position.

Accordingly, by obtaining and storing the accurate offset amounts between the stylus of the contact-type detector and the image probe in advance, the stylus of the contact-type detector can be automatically positioned at the center position of the circular concave portion or the circular convex portion with a simple operation and processing.

According to another aspect of the invention, a surface texture measuring method for measuring a surface texture of an object having a circular concave portion or a circular convex portion by using a surface texture measuring machine including: a stage on which the object is mounted; a contact-type detector having a stylus that is brought into contact with a surface of the object; an image probe that captures an image of the surface of the object; a relative movement mechanism that relatively moves the stage against the contact-type detector and the image probe and/or relatively moves the contact-type detector and the image probe against the stage; and a controller that controls a drive of the relative movement mechanism and executes processing on measurement data obtained by the contact-type detector and image data captured by the image probe, the surface texture measuring method including: acquiring position data of at least three points on a circular contour of the circular concave portion or the circular convex portion of the object by the image probe by operating the relative movement mechanism; approximating the position data to a circle to obtain a center position of the circle; operating the relative movement mechanism to position the stylus of the contact-type detector at the center position; and measuring the surface texture of the circular concave portion or the circular convex portion of the object while relatively moving the stylus of the contact-type detector and the object by operating the relative movement mechanism after the stylus of the contact-type detector is positioned at the center position of the circular concave portion on the circular convex portion of the object.

With this arrangement, firstly, in the contour data acquisition step, the relative movement mechanism is operated and the position data of the at least three points on the circular contour of the circular concave portion or the circular convex portion of the object are acquired by the image probe. Then, in the circle approximation step, the position data acquired in the contour data acquisition step are approximated to the circle to calculate the center position of the circle.

Next, in the stylus setting step, the relative movement mechanism is operated and the stylus of the contact-type detector is positioned at the center position obtained at the circle approximation step. In the measuring step, the surface texture of the circular concave portion or the circular convex portion is measured while the stylus of the contact-type detector and the object are relatively moved by operating the relative movement mechanism.

Thus, since the center position of the circular concave portion or the circular convex portion is known in advance, the stylus of the contact-type detector can be set at the center position of the circular concave portion or the circular convex portion. In other words, the operator does not have to set the tip end of the stylus at the measurement starting position on the object while visually checking and adjusting the position of the tip end of the stylus relative to the measurement area on the object as in a typical apparatus, thereby shortening the setting time of the stylus.

According to still another aspect of the invention, a surface texture measuring machine for measuring a surface texture of an object after adjusting an attitude of the object in parallel to or perpendicular to a predetermined measurement axis includes: a stage provided with a turntable on which the object is mounted, the turntable rotating the object within a predetermined plane; a contact-type detector having a stylus that is brought into contact with a surface of the object; an image probe that captures an image of the surface of the object; a relative movement mechanism that enable relative movement between the turntable and the contact-type detector; and a controller that controls the relative movement mechanism and the turntable, the controller including: an image probe control unit that captures the image of the object by the image probe; an inclination calculating unit that calculates an inclination angle of the object relative to the measurement axis based on the image of the object capture by the image probe control unit; and an attitude adjusting unit that rotates the turntable based on the inclination angle calculated by the inclination calculating unit and adjusts the attitude of the object in parallel to or perpendicular to the measurement axis.

With this arrangement, what is carried out in the preliminary measurement is only that the image probe captures the image of the object to calculate the inclination angle of the object relative to the measurement axis. Accordingly, the number of the steps in the preliminary measurement can be decreased, thereby shortening the time for the preliminary measurement. Moreover, since the measurement is carried out by the image probe, the measurement time can be shortened as compared with the measurement by the stylus. Consequently, the time for the preliminary measurement can be considerably shortened.

Further, since the preliminary measurement is a noncontact measurement by the image probe, the object is not damaged.

According to further aspect of the invention, a surface texture measuring machine for measuring a surface texture of an object after adjusting an attitude of the object in parallel to or perpendicular to a predetermined measurement axis includes: a stage provided with a leveling table on which the object is mounted, the leveling table inclining the object relative to a reference plane perpendicular to a displacing direction of the stylus; a contact-type detector having a stylus that is brought into contact with a to-be-measured surface of the object; an image probe that captures an image of the surface of the object; a relative movement mechanism that enable relative movement between the leveling table and the contact-type detector; and a controller that controls the relative movement mechanism and the leveling table, the controller including: a focusing unit that moves the image probe in a direction perpendicular to the reference plane at a plurality of points of the to-be-measured surface by the relative movement mechanism and determines a focal point of the image probe at each of the points; an inclination calculating unit that calculates an inclination angel of the to-be-measured surface relative to the reference plane based on a position perpendicular to the reference plane of the image probe at the each of the points; and an attitude adjusting unit that inclines the leveling table based on the inclination angle calculated by the inclination calculating unit and adjusts the attitude of the object so that the to-be-measured surface is in parallel to the reference plane.

With this arrangement, what is carried out in the preliminary measurement is only that the image probe is moved in a direction perpendicular to the reference plane so that the each of the points on the to-be-measured surface is positioned at the focal point of the image probe and then the inclination angle of the to-be-measured surface relative to the reference plane is calculated based on the position of the image probe at the each of the points in the direction perpendicular to the reference plane. Accordingly, the number of the steps in the preliminary measurement can be decreased, thereby shortening the time for the preliminary measurement. Moreover, since the measurement is carried out by the image probe, the measurement time can be shortened as compared with the measurement by the stylus. Consequently, the time for the preliminary measurement can be considerably shortened.

Further, since the preliminary measurement is a noncontact measurement by the image probe, the object is not damaged.

Preferably, the surface texture measuring machine according to the above aspect of the invention includes: a movement course calculating unit that, when a measurement starting position on the object is designated based on the image of the object captured by the image probe, calculates and stores a movement course of the relative movement mechanism so that the stylus of the contact-type detector is brought into contact with the measurement starting position on the object; and a stylus setting unit that operates the relative movement mechanism to follow the movement course calculated by the movement course calculating unit.

With this arrangement, the image of the object is initially captured by the image probe. Subsequently, when the measurement starting position on the object is designated based on the captured image of the object, the movement course calculating unit calculates and stores the movement course of the relative movement mechanism so that the stylus of the contact-type detector is brought into contact with the measurement starting position on the object. When a measurement is performed later, the relative movement mechanism is moved in accordance with the movement course calculated by the movement course calculating unit. In other words, the relative movement mechanism is moved in accordance with the stored movement course, thereby bringing the stylus of the contact-type detector into contact with the measurement starting position on the object.

In this manner, the stylus of the contact-type can be automatically set at the measurement starting position on the object. In other words, the operator does not have to set the tip end of the stylus at the measurement starting position on the object while visually checking and adjusting the position of the tip end of the stylus relative to the measurement starting position on the object as in a typical apparatus. Therefore, the stylus can be prevented from interfering with the object while reducing the burden on the operator.

In the surface texture measuring machine according to the above aspect of the invention, the image probe preferably includes a probe body and a probe head that is supported at a tip end of the probe body and is capable of capturing the image of the object, the probe head being attached to the probe body in a manner to be rotatable around an axis perpendicular to a direction of the relative movement of the contact-type detector and the stage and a displacing direction of the stylus when the stylus is in contact with the object.

With this arrangement, particularly, the image probe includes the probe body and the probe head that is supported at the tip end of the probe body and is capable of capturing the image of the object. The probe head is attached to the probe body in a manner to be rotatable around the axis perpendicular to the direction in which the contact-type detector and the stage are relatively moved (i.e., a trace direction) and the displacing direction of the stylus when the stylus is in contact with the object. Accordingly, by rotating the probe head around the axis, the probe head can be oriented in the displacing direction of the stylus and a direction perpendicular to the displacing direction.

When the probe head is oriented in the displacing direction of the stylus, for instance, an image of the object from a horizontal surface can be captured. When the probe head is oriented in the direction perpendicular to the displacing direction of the stylus, an image of the object from a vertical surface can be captured. Accordingly, even at a measurement of an inner surface texture of a hole formed on the vertical surface, by capturing the image of the vertical surface of the object by using the image probe, the stylus can be accurately positioned inside the hole formed on the vertical surface.

Therefore, the stylus can be prevented from interfering with the object while reducing the burden on the operator.

DETAILED DESCRIPTION OF PREFERRED EMBODIMENTS

First Exemplary Embodiment

Description of Surface Texture Measuring Machine (see FIGS. 1 to 5)

Figure 1:
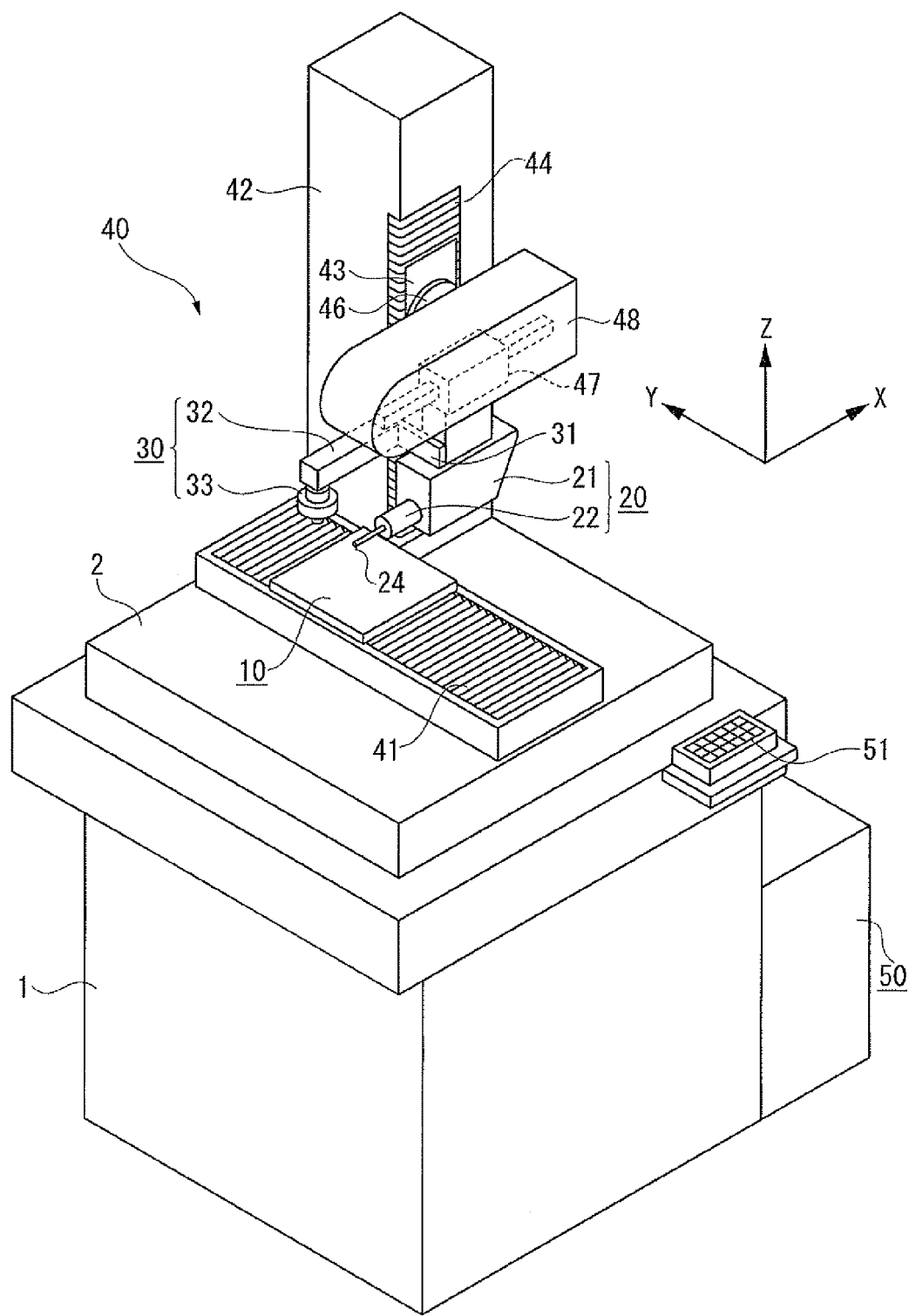
FIG. 1 is a perspective view showing a surface texture measuring machine according to a first exemplary embodiment of the present invention.
Figure 2:
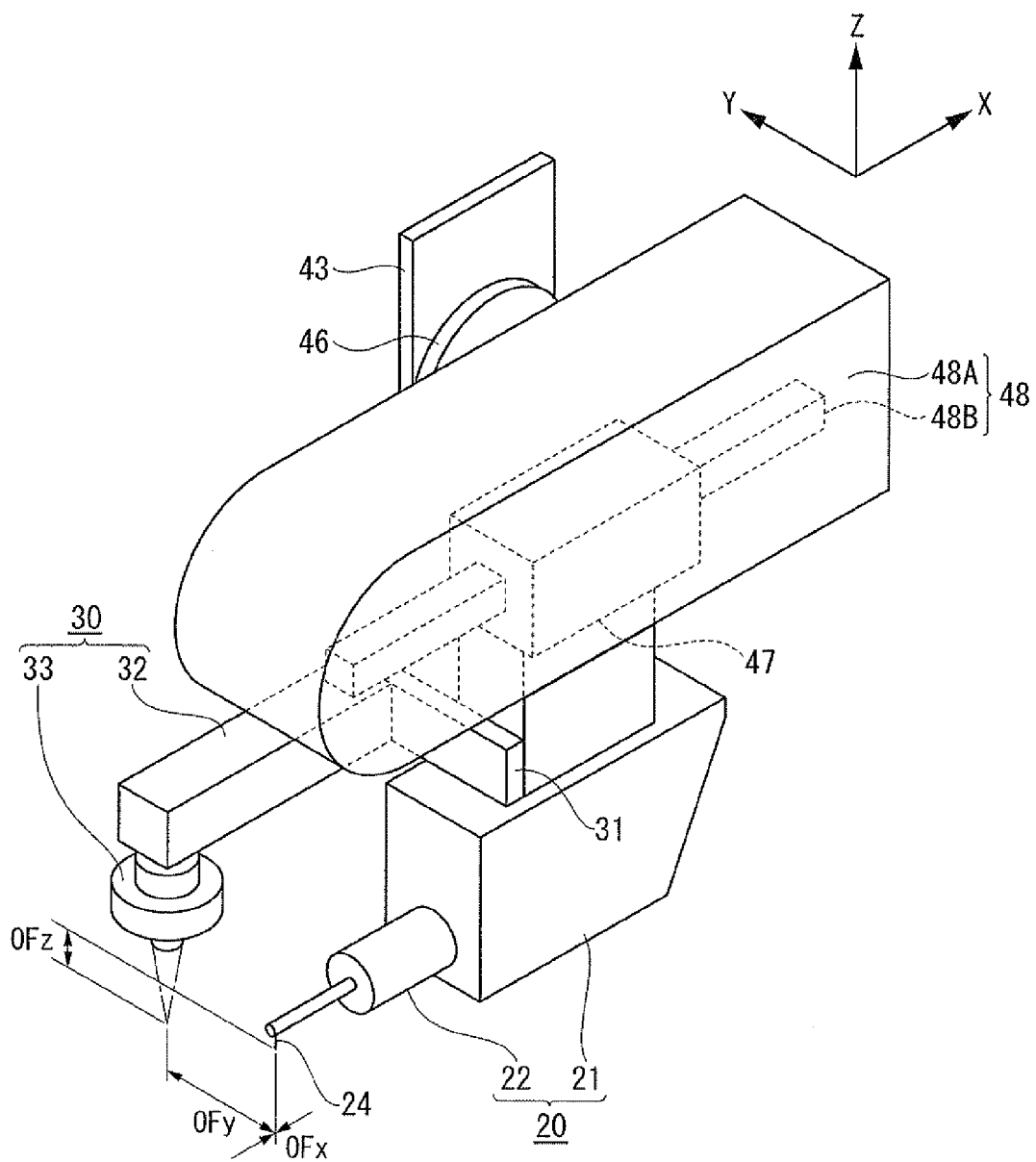
FIG. 2 is an enlarged perspective view showing a contact-type detector and an image probe according to the first exemplary embodiment.

As shown in FIGS. 1 and 2, a surface texture measuring machine according to a first exemplary embodiment of the invention includes: a mount stand 1; a base 2 being fixed on an upper surface of the mount stand 1; a stage 10 being mounted on the base 2, the stage 10 having an upper surface on which an object is mounted; a contact-type detector 20 being provided with a stylus 24 that is brought into contact with a surface of the object; an image probe 30 capturing an image of the surface of the object; a relative movement mechanism 40 that relatively moves the stage 10 against the contact-type detector 20 and the image probe 30 and moves the contact-type detector 20 and the image probe 30 against the stage 10; and a controller 50.

The relative movement mechanism 40 includes: a Y-axis driving mechanism 41 as a first movement mechanism being located between the base 2 and the stage 10 to move the stage 10 in a horizontal direction (Y-axis direction); a column 42 that stands upright on an upper surface of the base 2; a Z-slider 43 as a lifting member being provided to the column 42 movably in a vertical direction (Z-axis direction); a Z-axis driving mechanism 44 as a second movement mechanism that drives the Z-slider 43 to move in the vertical direction; a rotary plate 46 being provided to the Z-slider 43 via a rotation mechanism 45 (see FIG. 5) so as to be rotatable around a Y-axis; an X-slider 47 as a slide member being provided to the rotary plate 46 so as to be movable in a direction (X-axis direction) perpendicular to the moving direction of the stage 10 (Y-axis direction) and the lifting direction of the Z-slider 43 (Z-axis direction); and an X-axis driving mechanism 48 as a third movement mechanism that drives the X-slider 47 to move in the X-axis direction.

In this exemplary embodiment, the contact-type detector 20 and the image probe 30 are attached to the X-slider 47. Therefore, the relative movement mechanism 40 is provided by a three-dimensional movement mechanism that includes the Y-axis driving mechanism 41 that moves the stage 10 in the Y-axis direction, the Z-axis driving mechanism 44 that moves the contact-type detector 20 and the image probe 30 in the Z-axis direction, and the X-axis driving mechanism 48 that moves the contact-type detector 20 and the image probe 30 in the X-axis direction.

Each of the Y-axis driving mechanism 41 and the Z-axis driving mechanism 44 is provided by, for instance, a feed screw mechanism (not shown) that includes a ball screw shaft and a nut member screwed to the ball screw shaft.

The X-axis driving mechanism 48 includes a driving mechanism body 48A fixed to the rotary plate 46, a guide rail 48B provided to the driving mechanism body 48A in parallel to the X-axis direction to movably support the X-slider 47, a driving source (not shown) that drives the X-slider 47 to reciprocate along the guide rail 48B, and the like.

Figure 3:
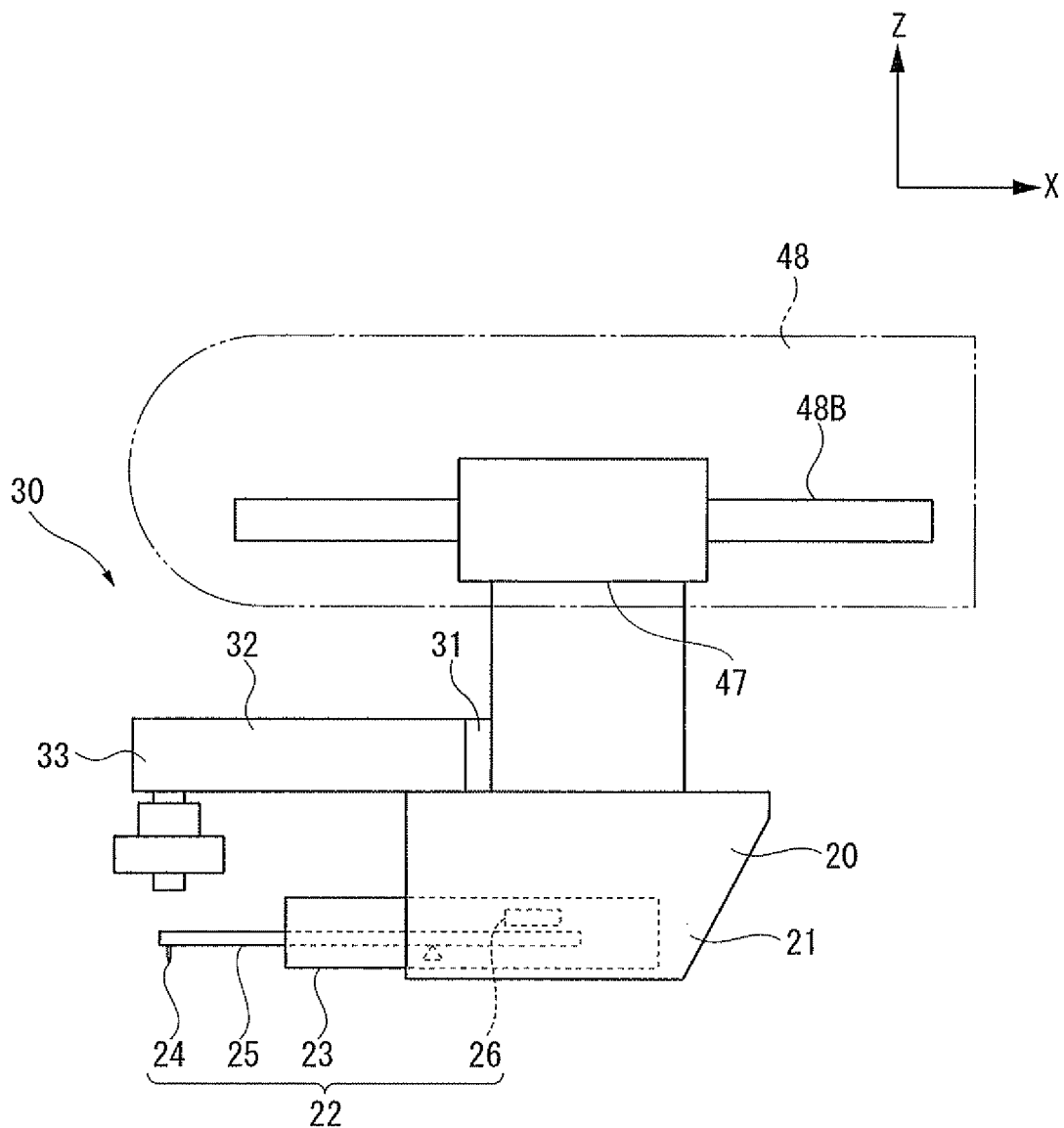
FIG. 3 is a front view showing the contact-type detector and the image probe according to the first exemplary embodiment.

As shown in FIG. 3, the contact-type detector 20 includes a detector body 21 being hung and supported on the X-slider 47, and a contact-type probe 22 being supported on the detector body 21 in parallel to the X-axis direction. The contact-type probe 22 includes a probe body 23, an arm 25 being swingably supported on the probe body 23 and being provided with the stylus 24 at a tip end thereof, and a detecting portion 26 that detects a swing amount of the arm 25.

The image probe 30 includes a cylindrical probe body 32 being integrally connected to the X-slider 47 via a connecting member 31 along with the contact-type detector 20, and a probe head 33 being downwardly supported on a tip end of the probe body 32.

Figure 4:
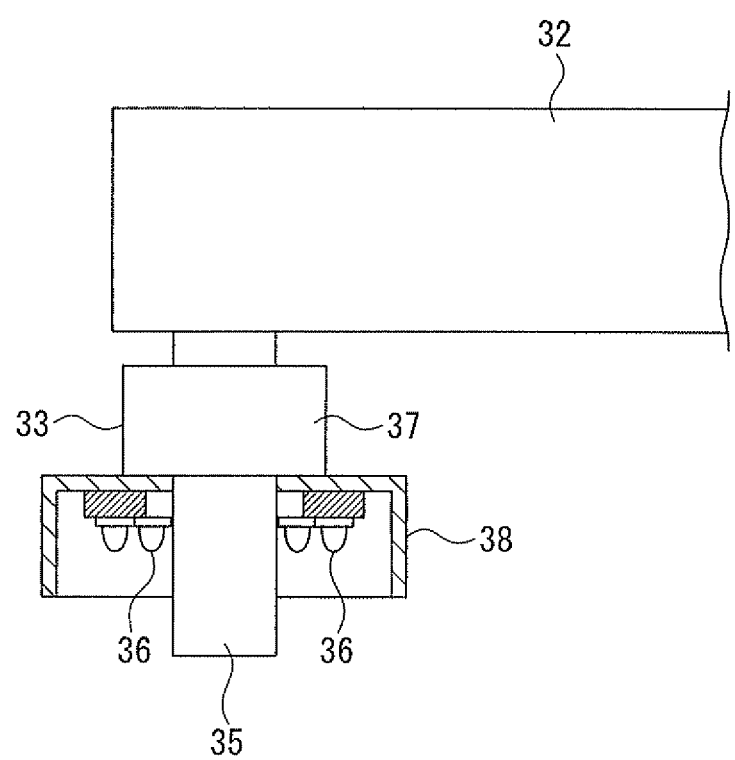
FIG. 4 shows the image probe according to the first exemplary embodiment.

As shown in FIG. 4, the probe head 33 includes an objective lens 35, an LED 36 as a light source being located on an outer periphery of the objective lens 35, a CCD sensor 37 that receives reflected light from the object that has passed through the objective lens 35 to capture an image of the object, and a cover 38 that covers the LED 36 and the surroundings thereof.

The image probe 30 is located at a position offset relative to the contact-type detector 20. Specifically, as shown in FIG. 2, a focal point of the objective lens 35 of the image probe 30 is deviated downward in the Z-axis direction from the tip end of the stylus 24 of the contact-type detector 20 by an offset amount OFz and rearward in the Y-axis direction from the longitudinal axis of the stylus 24 by an offset amount OFy. Incidentally, the focal point is located at the same position in the X-axis direction as the longitudinal axis of the stylus 24 (i.e., at a position corresponding to an offset amount OFx=0).

Figure 5:
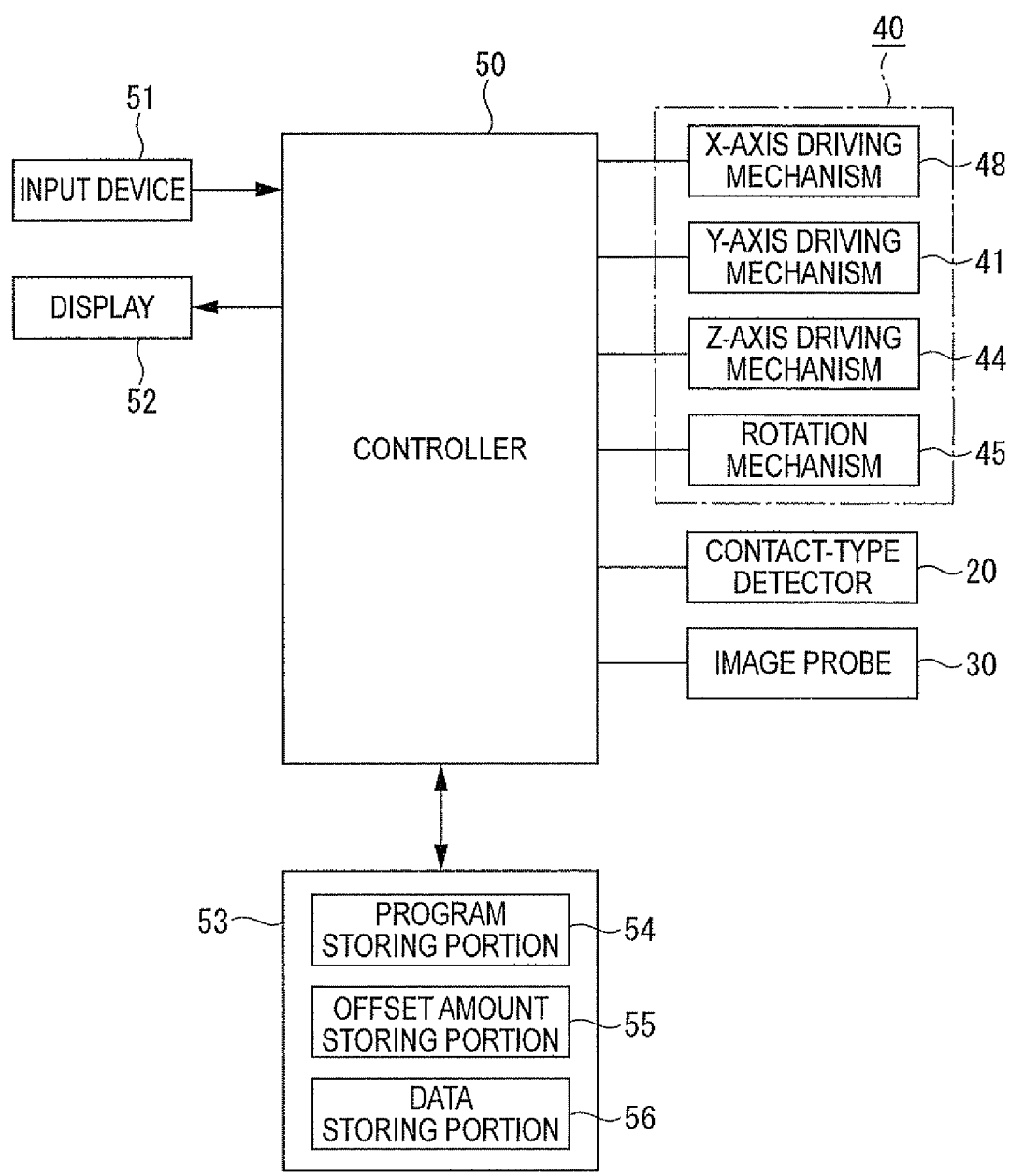
FIG. 5 is a block diagram showing a control system according to the first exemplary embodiment.

As shown in FIG. 5, the controller 50 is connected to an input device 51, a display 52 and a storage 53 in addition to the relative movement mechanism 40, the contact-type detector 20 and the image probe 30.

The input device 51 is provided with, for instance, a portable keyboard, a joystick or the like and is used not only to input various kinds of operation commands and data but also to designate a position at which the stylus 24 is to be set (measurement starting position) in accordance with the image captured by the image probe 30.

The display 52 shows not only the image captured by the image probe 30 but also profile and/or roughness data obtained by the contact-type detector 20.

The storage 53 includes a program storing portion 54 that stores a measurement program and the like, an offset amount storing portion 55 as an offset amount storage unit that stores the offset amounts OFx, OFy and OFz between the stylus 24 of the contact-type detector 20 and the image probe 30, a data storing portion 56 that stores image data and measurement data obtained from measurement, and the like.

The controller 50 includes: a center position calculating unit that, when position data of at least three points of a circular contour of a circular concave portion or circular convex portion of the object are entered by the image probe 30 in accordance with the measurement program stored in the program storing portion 54, approximates the entered position data to a circle to obtain a center position of the circle; a stylus setting unit that, when the center position is obtained by the center position calculating unit, operates the relative movement mechanism 40 to position the stylus 24 of the contact-type detector 20 at the center position; and a measurement performing unit that operates the relative movement mechanism 40 to enable relative movement between the contact-type detector 20 and the object while the stylus 24 of the contact-type detector 20 is in contact with the object, thereby measuring the surface texture of the object.

When the center position is obtained by the center position calculating unit, the stylus setting unit operates the relative movement mechanism 40 to position the image probe 30 at the center position and operates the relative movement mechanism 40 by offset amounts of OFx, OFy and OFz stored in an offset amount storing portion 55 to position the stylus 24 of the contact-type detector 20 at the center position.

The controller 50 further includes an edge detection function for detecting the edge of the object in the image of the object captured by the image probe 30, and an auto-focusing function for displacing the objective lens 35 in a heightwise direction of the object (Z-axis direction) so that the focal point of the objective lens is set at the surface of the object defined in the heightwise direction to detect a heightwise position of the object depending on the displacement amount of the objective lens 35. The edge detection function may be based on any known principle of detection but may use, for instance, a technique in which an average intensity (light intensity) in a direction perpendicular to the detection direction of the image probe 30 is obtained to detect a position at which the average intensity becomes equal to or below a preset threshold as the edge.

<Description of Object (see FIGS. 6A and 6B)>

An object 60A includes a circular concave portion 61 at a center thereof. The circular concave portion 61 has a circular contour and a spherical and concave interior. The circular concave portion 61 is exemplified by a concave microlens molding surface formed on a microlens array mold, but not limited to this.

<Description of Measuring Method (see FIGS. 7A to 11)>

Figure 7A:
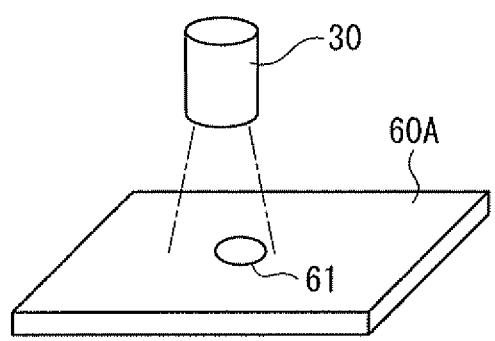
FIG. 7A shows the image probe being moved near the object in the first exemplary embodiment.
Figure 7B:
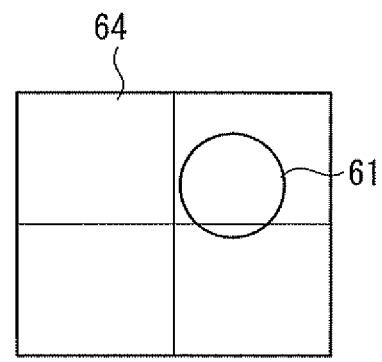
FIG. 7B shows the image probe being moved near the object in the first exemplary embodiment.

(1) As shown in FIGS. 7A and 7B, the relative movement mechanism 40 is operated to move the circular concave portion 61 of the object 60A within a view field 64 of the image probe 30.

Figure 8A:
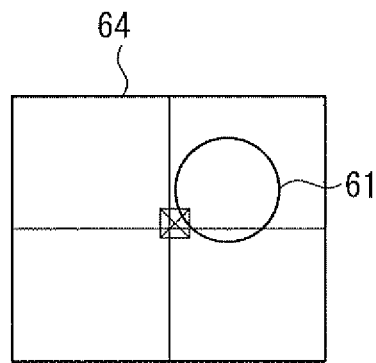
FIG. 8A shows acquisition of position data of a circular contour in the first exemplary embodiment.
Figure 8B:
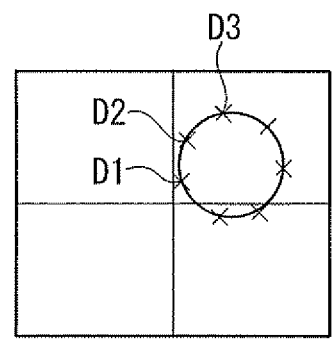
FIG. 8B shows acquisition of position data of the circular contour in the first exemplary embodiment.

(2) As shown in FIGS. 8A and 8B, in a vicinity of the circular concave portion 61 of the object 60A, the objective lens 35 of the image probe 30 is automatically focused so as to set the focal point of the objective lens 35 near the circular concave portion 61 of the object 60A and data D1, D2, D3 and so on of at least three points of the circular contour of the circular concave portion 61 are acquired by using the edge detection function (a contour data acquisition step).

Figure 9:
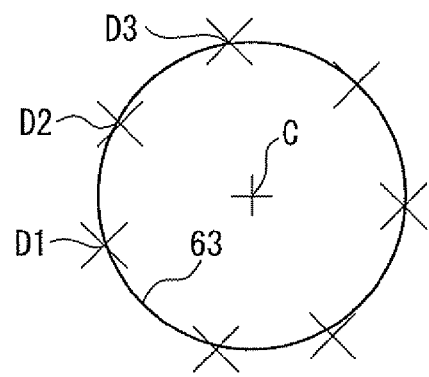
FIG. 9 shows an approximation step to a circle in the first exemplary embodiment.

(3) As shown in FIG. 9, the controller 50 then approximates the position data acquired in the contour data acquisition step to a circle 63 to obtain a center position C of the circle (a circle approximation step).

Figure 10:
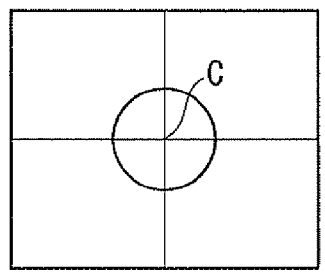
FIG. 10 shows the image probe being moved to a center position in the first exemplary embodiment.

(4) Subsequently, as shown in FIG. 10, the relative movement mechanism 40 is operated to position the image probe 30 at the center position C.

Figure 11:
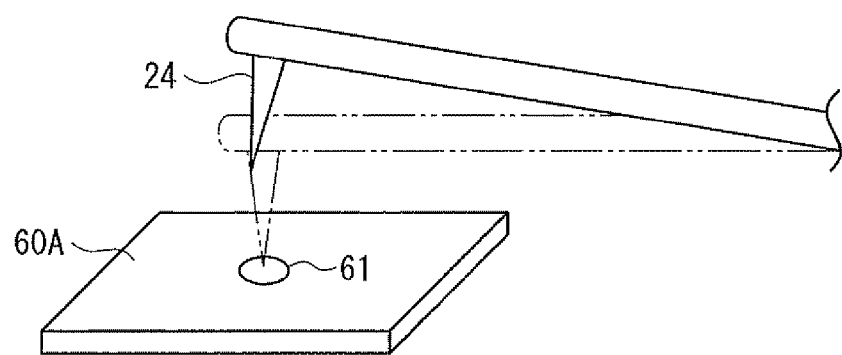
FIG. 11 shows a stylus being moved to the center position in the first exemplary embodiment.
Figure 12:
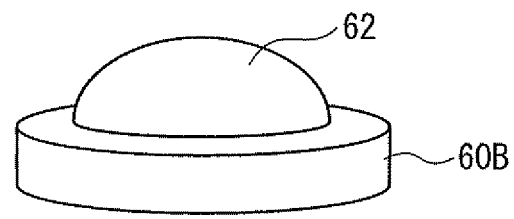
FIG. 12 shows another object to be measured according to the first exemplary embodiment.

(5) Subsequently, as shown in FIG. 11, the relative movement mechanism 40 is operated by the offset amounts OFx, OFy and OFz stored in the offset amount storing portion 55 to position the stylus 24 of the contact-type detector 20 at the center position C (a stylus setting step).

(6) In this state where the stylus 24 of the contact-type detector 20 is positioned at the center position C of the circular concave 61 of the object 60A, the relative movement mechanism 40 is operated to enable relative movement between the stylus 24 of the contact-type detector 20 and the object 60A (a measuring step). Thus, the surface texture of the circular concave portion 61 is measured.

Advantages of First Exemplary Embodiment

In the surface texture measuring machine including the contact-type detector 20 having the stylus 24 and the image probe 30 according to the first exemplary embodiment, when the operator operates the relative movement mechanism 40 to acquire the position data of at least three point of the circular contour of the circular concave portion 61 of the object 60A by the image probe 30, the controller 50 approximates the entered position data to the circle 63 to obtain the center position C of the circle 63, and then operates the relative movement mechanism 40 to position the stylus 24 of the contact-type detector 20 at the center position C.

In this manner, the stylus 24 of the contact-type detector 20 can be automatically set at the center position C of the circular concave portion 61 of the object 60A. In other words, the operator does not have to position the tip end of the stylus at the circular concave portion while visually checking and adjusting the position of the tip end of the stylus relative to the circular concave portion as in a typical apparatus, thereby shortening the setting time of the stylus.

The stylus 24 of the contact-type detector 20 and the image probe 30 are offset from each other in the Z-axis direction and the Y-axis direction respectively by the offset amounts OFz and OFy. Thus, during the measurement, the stylus 24 and the image probe 30 can be prevented from being interfered with each other without providing a mechanism for evacuating one of the stylus 24 and the image probe 30 that is not used for the measurement.

Further, the offset amounts OFx, OFy and OFz between the tip end of the stylus 24 of the contact-type detector 20 and the image probe 30 are stored in the offset amount storing portion 55. Accordingly, by calculating the center position C of the circular concave portion 61, operating the relative movement mechanism 40 to position the image probe 30 at the center position C and operating the relative movement mechanism 40 by the offset amounts OFx, OFy and OFz stored in the offset amount storing portion 55, the stylus 24 of the contact-type detector 20 can be automatically positioned at the center position C.

Accordingly, by accurately obtaining the offset amounts OFx, OFy and OFz between the stylus 24 of the contact-type detector 20 and the image probe 30 in advance, the stylus 24 of the contact-type detector 20 can be automatically positioned at the center position C of the circular concave portion 61 with a simple operation and processing.

Alternatively, only the image probe 30 can be used for the measurement.

For instance, while a width of a line, a diameter of a hole, or the like can be measured by using an image captured by the image probe 30, a dimension in an optical-axial direction of the objective lens 35 (level difference height) or the like can be measured by using the auto-focusing function of the image probe 30.

The relative movement mechanism 40 includes the Y-axis driving mechanism 41 that moves the stage 10 on which the object is mounted in the Y-axis direction, and the X-axis driving mechanism 48 and the Z-axis driving mechanism 44 that respectively move the contact-type detector 20 and the image probe 30 in the X-axis direction and the Z-axis direction. Thus, the relative movement mechanism 40 enables the object and the contact-type detector 20 and the image probe 30 to move in the three dimensional directions, i.e., the X-axis direction, the Y-axis direction and the Z-axis direction that are set perpendicular to one another. Thus, the profile and surface roughness of the object can be measured irrespective of an orientation and attitude of a measurement portion of the object.

Both the contact-type detector 20 and the image probe 30 are attached to the X-slider 47 while being offset from each other. Thus, there can be provided a simple and low-cost structure as compared with a device in which a mechanism is provided for separately moving the contact-type detector 20 and the image probe 30.

The image probe 30 includes the objective lens 35, the LED 36 as a light source being located on the outer periphery of the objective lens 35, and the CCD sensor 37 that receives reflected light from the object that has passed through the objective lens 35. Thus, the CCD sensor 37 can highly accurately obtain the image of the surface of the object through the objective lens 35. In addition, since the LED 36 is located around the objective lens 35, the image probe 30 can be downsized as compared with a case where a lighting device is separately provided.

Modifications of First Exemplary Embodiment (see FIGS. 12 to 17)

Figure 6A:
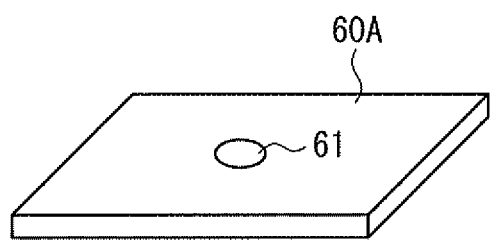
FIG. 6A shows an object to be measured according to the first exemplary embodiment.
Figure 6B:
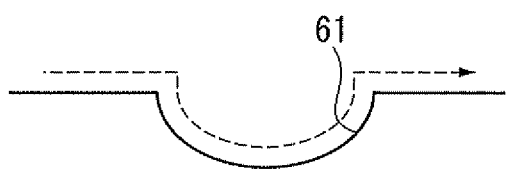
FIG. 6B shows the object to be measured according to the first exemplary embodiment.

The object to be measured is not limited to the object shown in FIGS. 6A and 6B. For instance, the object may be an object 60B including a circular convex portion 62 at a center thereof. The circular convex portion 62 has a circular contour and a spherical and convex interior.

A surface texture of the circular convex portion 62 of the object 60B is measured as shown in FIGS. 13 to 17.

Figure 13:
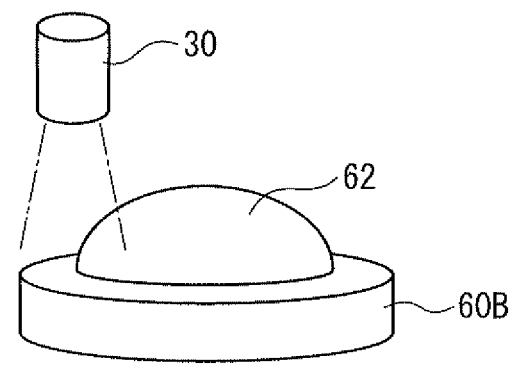
FIG. 13 shows the image probe being moved near the object shown in FIG. 12 in measuring the object.

(11) As shown in FIG. 13, the relative movement mechanism 40 is operated to move the circular convex portion 62 of the object 60B within a view field 64 of the image probe 30.

Figure 14A:
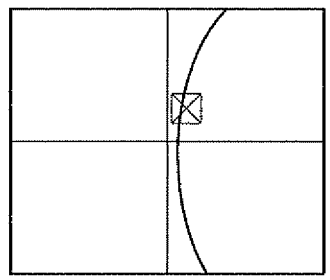
FIG. 14A shows acquisition of position data of a circular contour in the measurement of the object shown in FIG. 12.
Figure 14B:
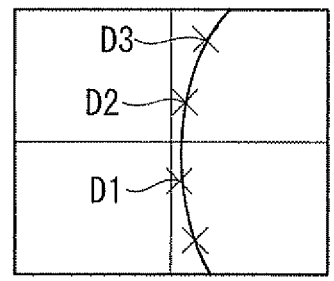
FIG. 14B shows acquisition of position data of the circular contour in the measurement of the object shown in FIG. 12.
Figure 15:
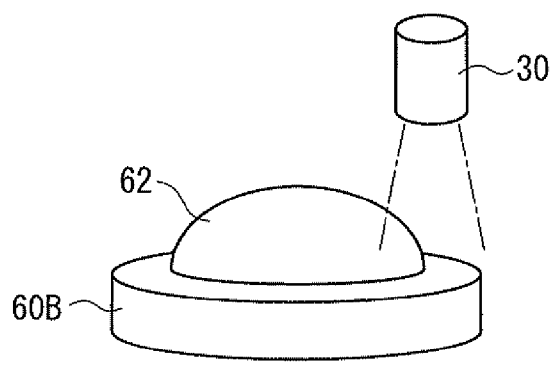
FIG. 15 shows the image probe being moved to another position in the measurement of the object shown in FIG. 12.

(12) As shown in FIGS. 14A and 14B, in the vicinity of the circular convex portion 62 of the object 60B, the objective lens 35 of the image probe 30 is automatically focused so as to set the focal point of the objective lens 35 near the circular convex portion 62 of the object 60B and data D1, D2, D3 and so on of at least three points of the circular contour of the circular convex portion 62 are acquired by using the edge detection function. This operation is repeated three times or more in total at other positions where the circular convex portion 62 of the object 60B is within the visual field of the image probe 30 (see FIG. 15) (a contour data acquisition step).

Figure 16:
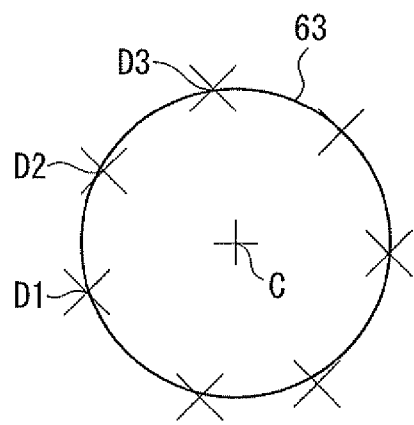
FIG. 16 shows an approximation step to a circle in the measurement of the object shown in FIG. 12.

(13) As shown in FIG. 16, the controller 50 then approximates the position data acquired in the contour data acquisition step to the circle 63 to obtain the center position C of the circle (a circle approximation step).

(14) Subsequently, the relative movement mechanism 40 is operated to position the image probe 30 at the center position C.

Figure 17:
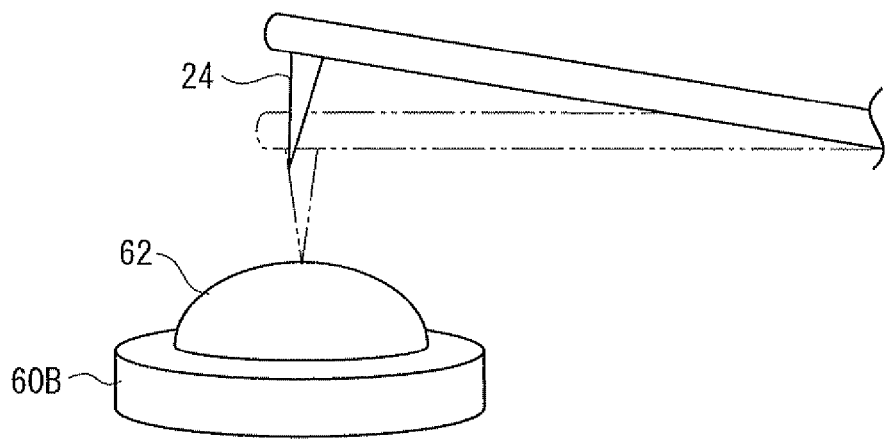
FIG. 17 shows the stylus being moved to the center position in the first exemplary embodiment.
Figure 18A:
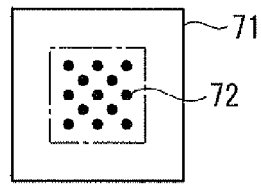
FIG. 18A is an illustration showing a measurement of a microlens mold.
Figure 18B:
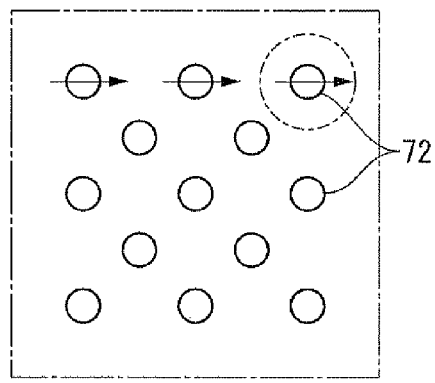
FIG. 18B is another illustration showing the measurement of the microlens mold.
Figure 18C:
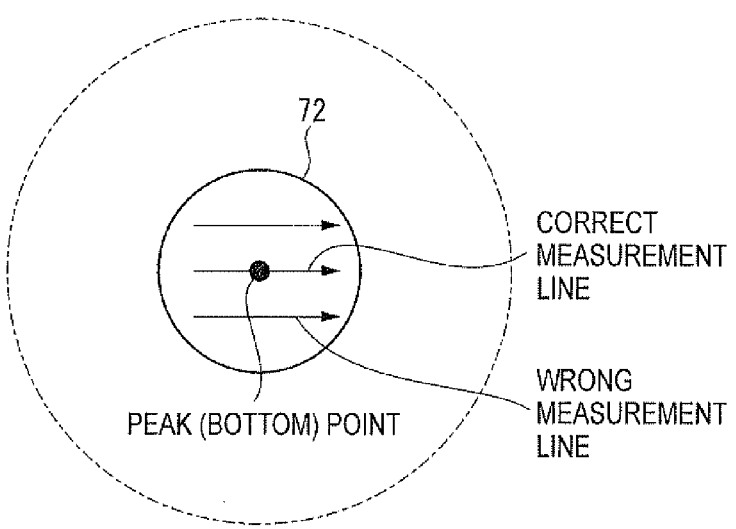
FIG. 18C is further illustration showing the measurement of the microlens mold.
Figure 19A:
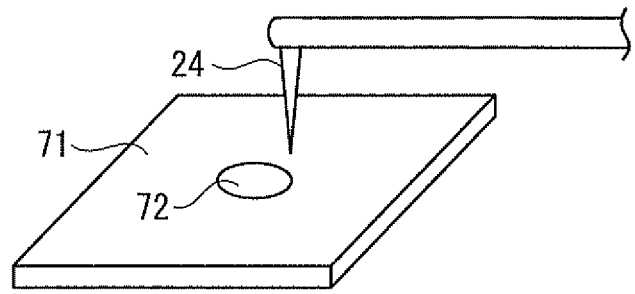
FIG. 19A shows an example of a measurement of a microlens mold by a typical measuring method.
Figure 19B:
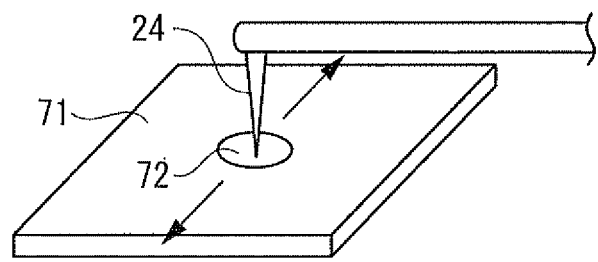
FIG. 19B shows the example of the measurement of the microlens mold by the typical measuring method.
Figure 19C:
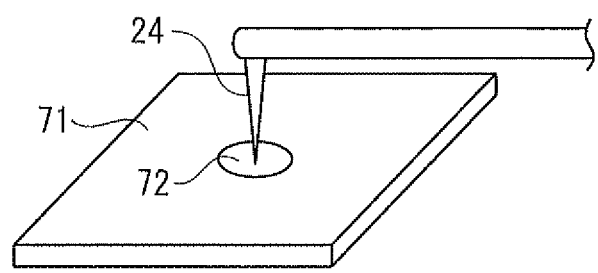
FIG. 19C shows the example of the measurement of the microlens mold by the typical measuring method.

(15) As shown in FIG. 17, the relative movement mechanism 40 is operated by the offset amounts OFx, OFy and OFz stored in the offset amount storing portion 55 to position the stylus 24 of the image probe 20 at the center position C (a stylus setting step).

(16) In this state where the stylus 24 of the contact-type detector 20 is positioned at the center position C of the circular convex 62 of the object 60B, the relative movement mechanism 40 is operated to enable relative movement between the stylus 24 of the contact-type detector 20 and the object 60B (a measuring step). Thus, the surface texture of the circular convex portion 62 is measured.

It should be noted that the accuracy of this measurement is expected to be improved by calculating an inclination (an inclination relative to the horizon) of the object 60B based on the automatically-focused data in the heightwise direction of the object 60B (Z-axis direction) and changing the attitude of the object 60B, when the automatic focus and the edge detection are performed in three other positions where the circular convex portion 62 of the object 60B is located within the visual field of the image probe 30. The attitude of the object 60B can be changed by inserting an inclined table between the stage 10 and the object 60B and moving the inclined table.

Though the contact-type detector 20 includes the arm 25 being provided with the stylus 24 at the tip end thereof and the detecting portion 26 that detects the swing amount of the arm 25, the contact-type detector 20 may have any other arrangement as long as the surface profile and roughness of an object can be measured while the stylus 24 is in contact with the object.

Though the image probe 30 includes the probe head 33 being provided with the objective lens 35, the LED 36 as a light source being located on the outer periphery of the objective lens 35 and the CCD sensor 37 that receives reflected light from the object that has passed through the objective lens 35 to capture the image of the object, the invention is not limited thereto.

For instance, the LED 36 as a light source may be provided separately from the image probe. Furthermore, the objective lens 35 may be replaceable so that the objective lens 35 is replaced with one having a different magnification, so that an appropriate operation can be performed depending on the size of the measurement area on the object.

While the relative movement mechanism 40 enables the stage 10 to move in the Y-axis direction and the contact-type detector 20 and the image probe 30 to move in the X-axis direction and the Z-axis direction, the invention is not limited thereto. In other words, as long as the stage 10, and the contact-type detector 20 and the image probe 30 are movable in the three dimensional directions, either one of the stage 10 and the contact-type detector 20 and the image probe 30 may be movable.

Alternatively, the contact-type detector 20 and the image probe 30 may be associated with their respective relative movement mechanisms so that the contact-type detector 20 and the image probe 30 are independently moved.

Second Exemplary Embodiment

It should be noted that components which are identical or correspond to those of the first exemplary embodiment will be denoted by the same reference numerals, description of which will be omitted, for describing a second exemplary embodiment.

Figure 20:
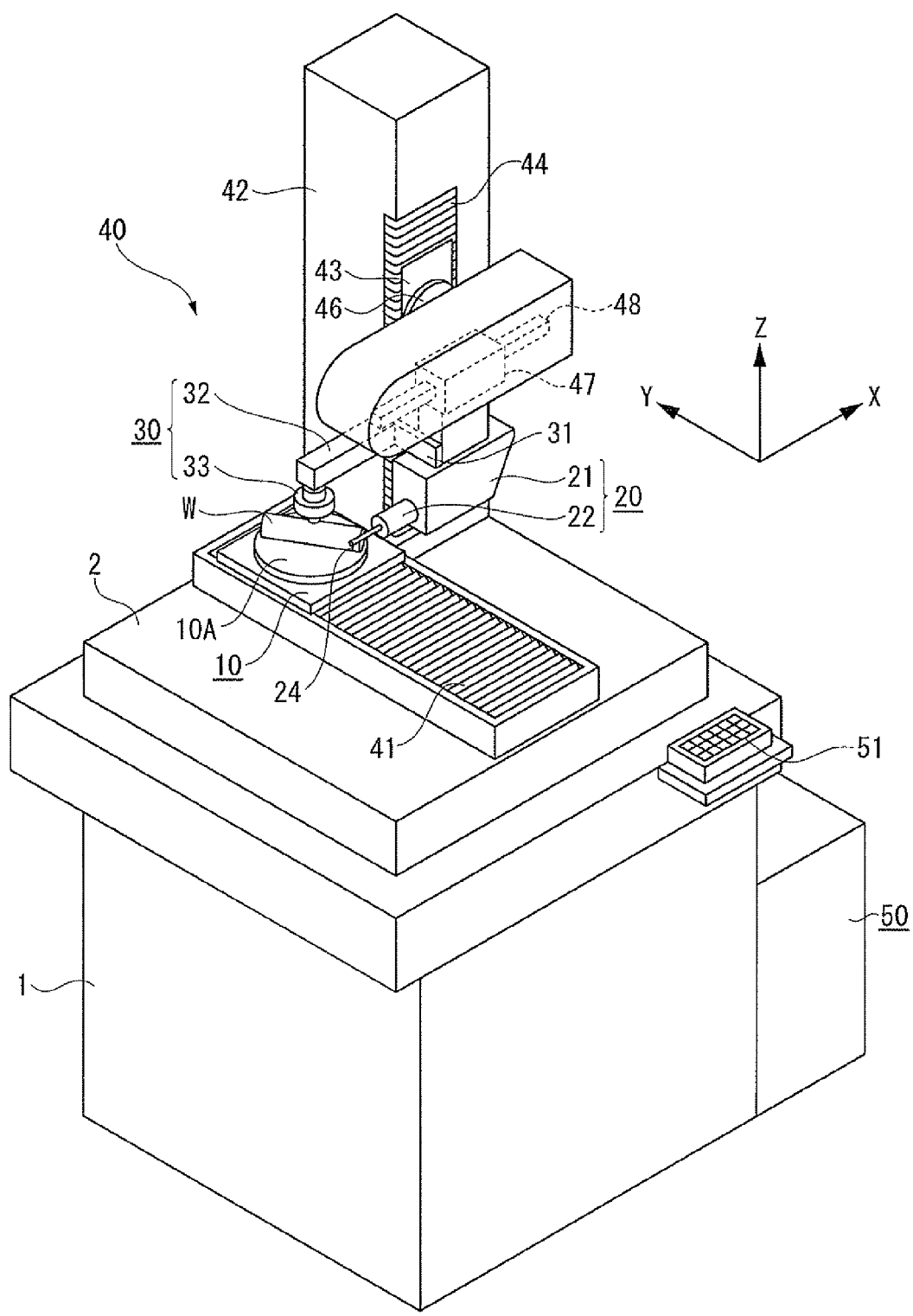
FIG. 20 is a perspective view showing a surface texture measuring machine according to a second exemplary embodiment of the invention.
Figure 21:
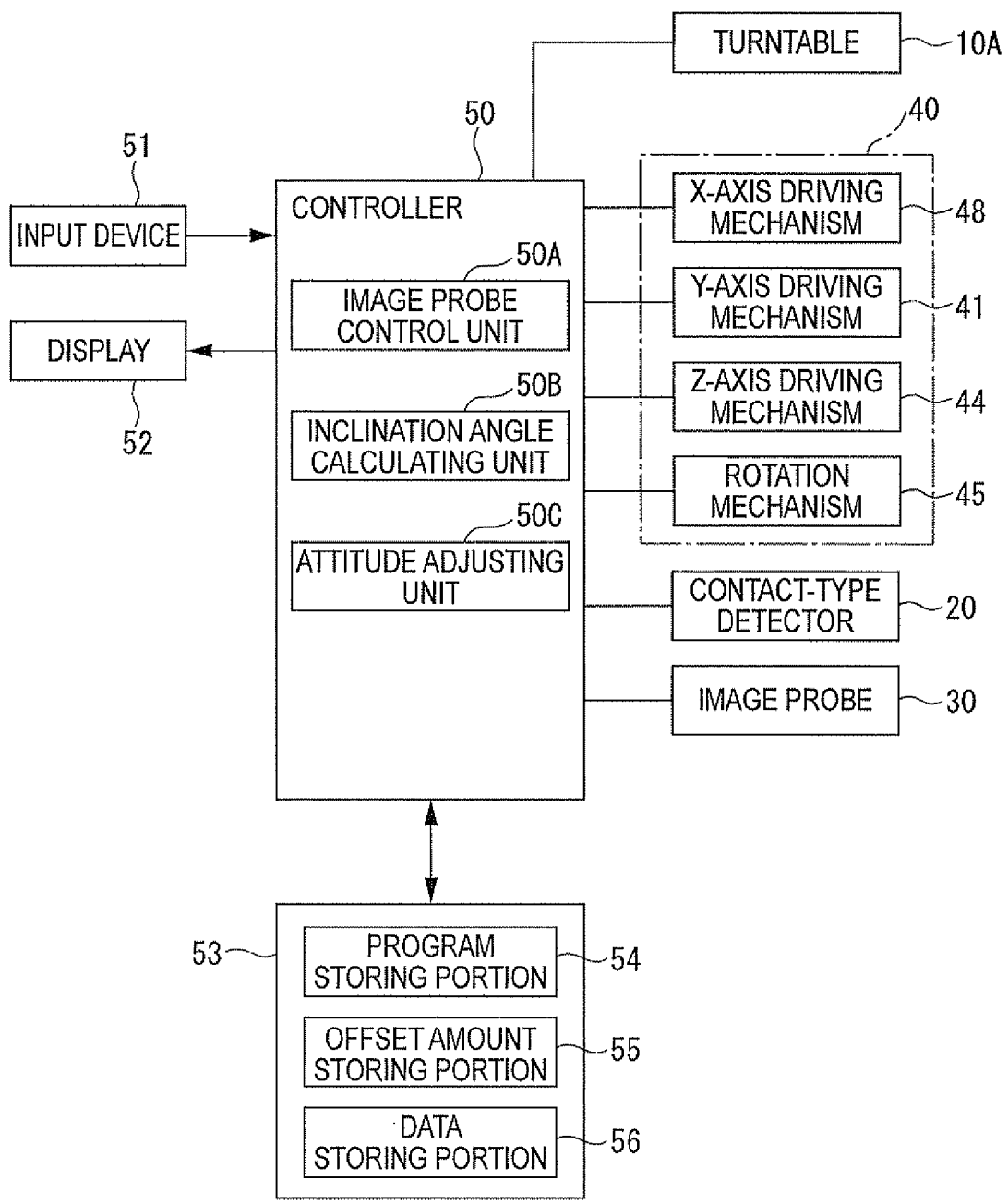
FIG. 21 is a block diagram showing a control system according to the second exemplary embodiment.

A surface texture measuring machine according to the second exemplary embodiment can adjust the attitude of the object in parallel to or perpendicular to a predetermined measurement axis. As shown in FIGS. 20 and 21, a turntable 10A is added to the surface texture measuring machine according to the first exemplary embodiment.

The turntable 10A is mounted on the stage 10 and rotated by a command from the controller 50. Thus, an object W is rotated within a horizontal plane (an XY plane). The object W is cylindrical in the second exemplary embodiment.

The image probe 30 includes a component for positioning the object W at the focal point of the objective lens 35 as needed in addition to the above components. When the relative position between the image probe 30 and the object W is to be determined, for instance, by a so-called pinhole method, the image probe 30 includes a tube lens provided at a downstream of an optical path of the objective lens 35, and photodiodes respectively provided on a front side and a rear side of a focal point of the tube lens. The image probe 30 is moved by the controller 50 via the relative movement mechanism 40 in a vertical direction relative to the object W so as to equalize the amounts of light received by the respective photodiodes to be positioned where the object W is located at the focal point of the objective lens 35.

Alternatively, when the relative position between the image probe 30 and the object W is to be determined by a so-called contrast method, the image probe 30 includes a light source projecting a predetermined pattern onto the object W via a projection plate and an objective lens, The image probe 30 captures the predetermined pattern projected on the object W. In addition, the image probe 30 is moved by the controller 50 via the relative movement mechanism 40 in a vertical direction relative to the object W based on a contrast of the captured pattern image, and is positioned where the object W is located at the focal point of the objective lens 35.

In such a surface texture measuring machine, when the attitude of the object W is inclined relative to the measurement axis during an actual measurement, the stylus 24 is displaced in an outer circumferential direction of the cylindrical object W as well as in an axial direction of the object W. Accordingly, a measurement value includes a value showing a cylindrical outer circumferential profile, thereby causing an error in a measurement result. Accordingly, in order to prevent generation of such an error, the controller 50 includes an image probe control unit 50A, an inclination angle calculating unit 50B and an attitude adjusting unit 50C. These units 50A to 50C perform a preliminary measurement in advance of an actual measurement and adjust the attitude of the object W, for instance, in parallel to the measurement axis.

An attitude adjustment method of the object W by the respective units 50A to 50C will be described as follows.

Figure 22:
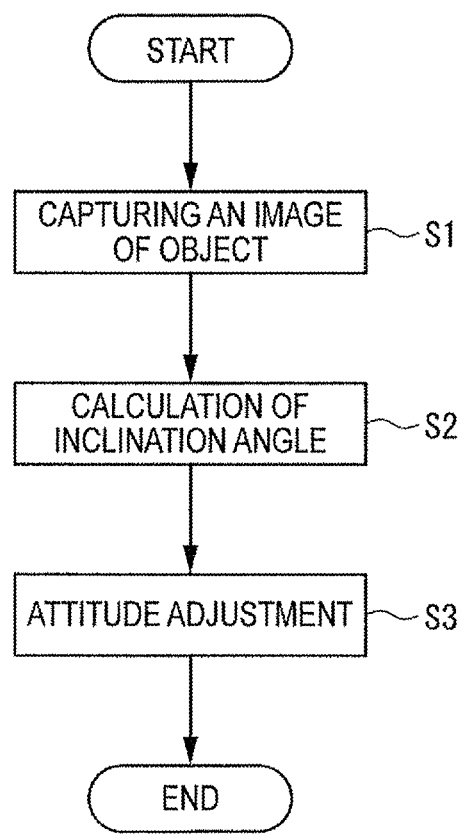
FIG. 22 is a flow chart for describing an attitude adjustment method.
Figure 23:
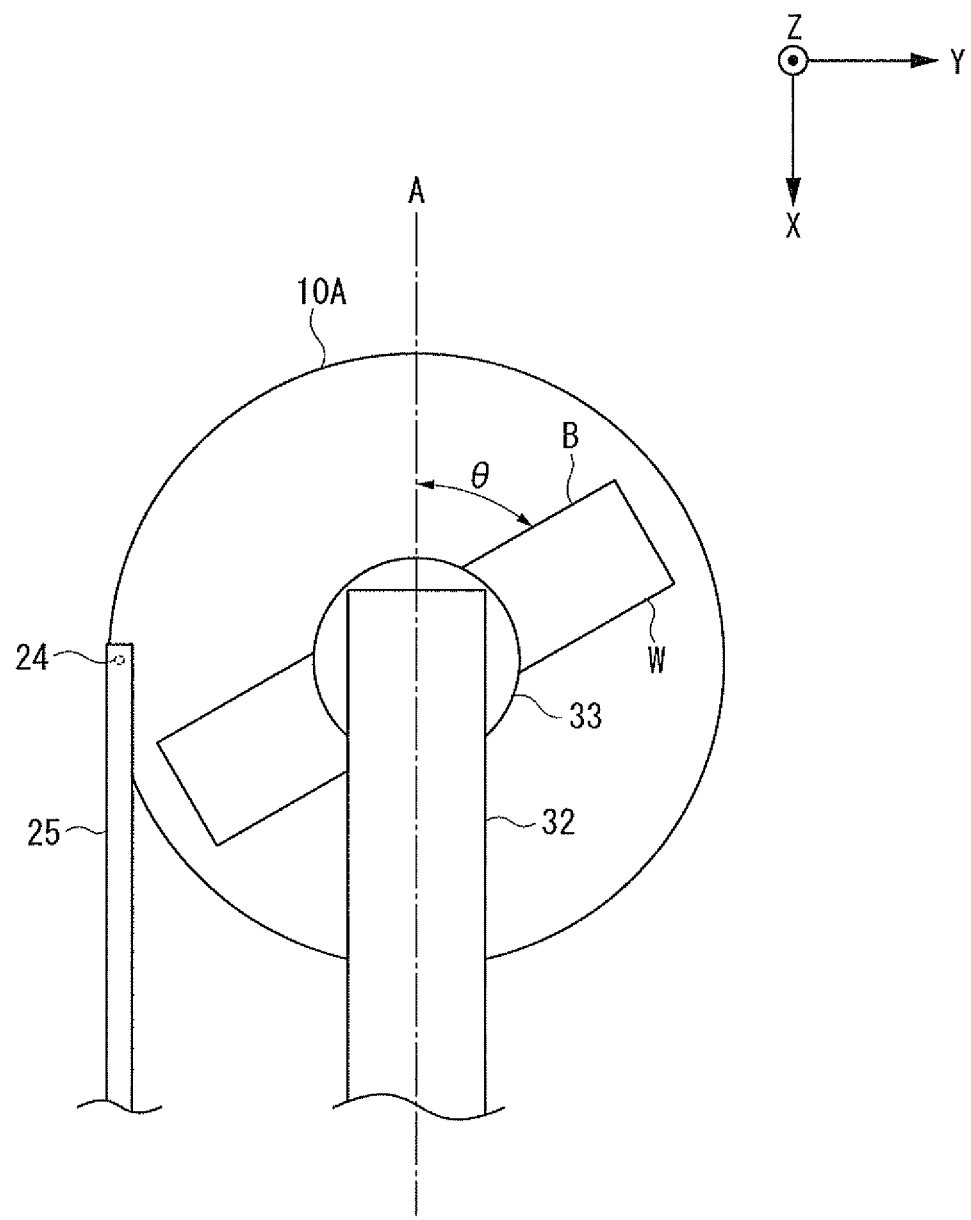
FIG. 23 is a plan view showing an image probe and an object to be measured.

FIG. 22 is a flow chart for showing the attitude adjustment method. FIG. 23 is a plan view showing the image probe 30 and the object W.

Firstly, the operator controls the relative movement mechanism 40 by operating the input device 51 and moves the image probe 30 above the object W.

Under this state, when a command from the input device 51 is entered through the input device 51 operated by the operator, the image probe control unit 50A moves the image probe 30 in a vertical direction (a Z axis direction) by controlling the relative movement mechanism 40 and positions the object W at the focal point of the objective lens 35 to capture an image of the object W by the image probe 30 (an image capture step S1). As a focusing method of the image probe 30 by the image probe control unit 50A in this step, any method such as the pinhole method and the contrast method as described above is applicable as needed.

After the step S1, the inclination angle calculating unit 50B calculates a generatrix B of the object W from an outer profile of the object W based on the captured image of the object W to calculate an inclination angle $\theta$ of the generatrix B relative to the measurement axis A as an inclination angle $\theta$ of the object W relative to the measurement axis A (an inclination angle calculation step S2).

Figure 24:
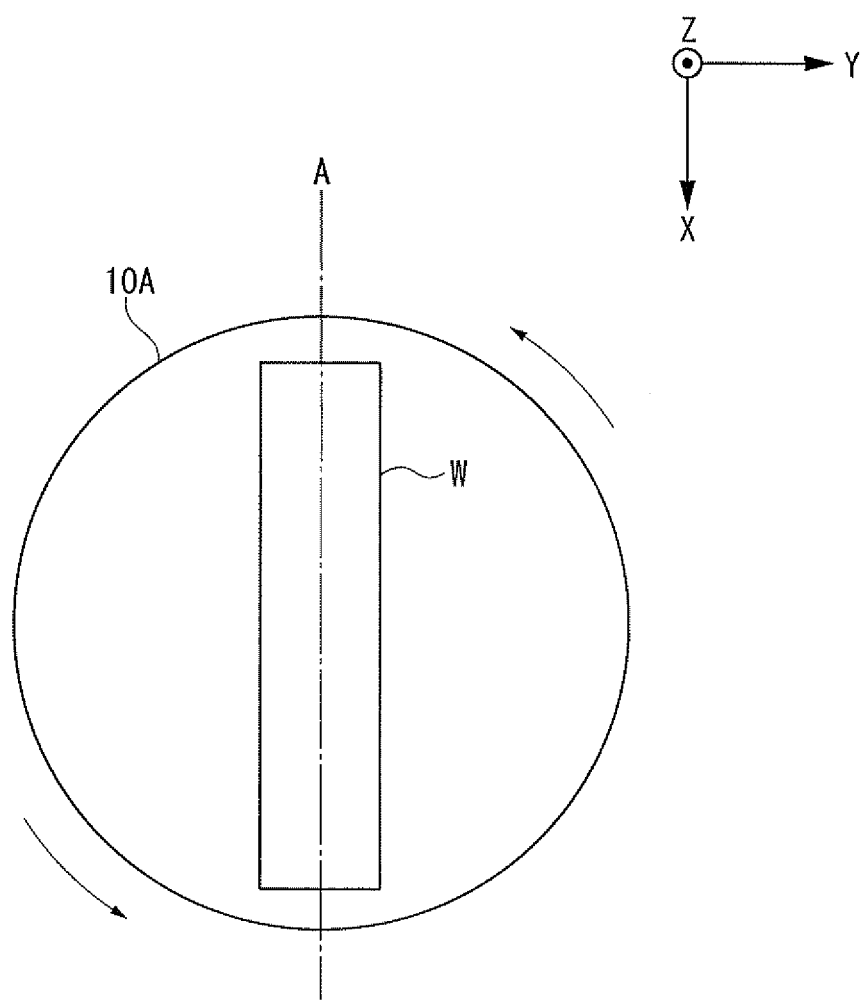
FIG. 24 is a plan view showing an attitude adjustment of the object by an attitude adjusting unit.

FIG. 24 is a plan view showing an attitude adjustment of the object W by the attitude adjusting unit 50C.

After the step S2, the attitude adjusting unit 50C rotates the turntable 10A based on the inclination angle $\theta$ and adjusts the attitude of the object W in parallel to the measurement axis A (an adjustment step S3). Accordingly, the attitude of the object W is adjusted in parallel to the measurement axis A, thereby carrying out the actual measurement with high accuracy.

Figure 25:
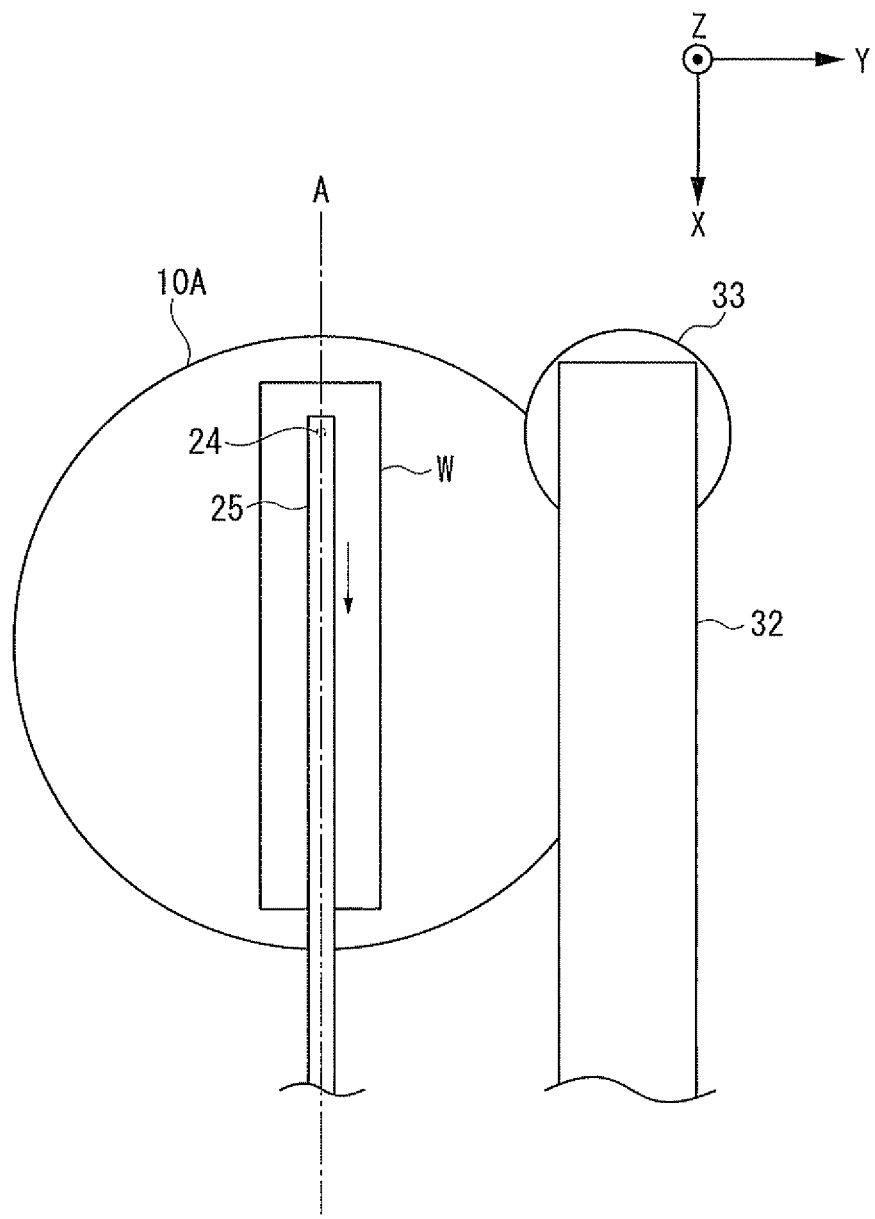
FIG. 25 is a plan view showing an actual measurement by a controller.

FIG. 25 is a plan view showing the actual measurement by the controller 50.

After the attitude of the object W is adjusted as described above, the controller 50 controls the relative movement mechanism 40 to move the stylus 24 to the inputted measurement starting position. Next, the controller 50 controls the X-axis driving mechanism 48 and moves the stylus 24 from the measurement starting position to an inputted measurement end position along the measurement axis A, thereby measuring the surface texture of the object W along the axial direction.

As described above, in order to measure the surface texture of the object W along the axial direction at the actual measurement, the respective units 50A to 50C perform the so-called alignment, by which the attitude of the object W is adjusted in parallel to the measurement axis A. However, in order to measure the surface texture along a direction perpendicular to the axial direction of the object W in the actual measurement, the respective units 50A to 50C perform a so-called right angling, by which the attitude of the object W is adjusted perpendicular to the measurement axis A, in the same manner as that in the alignment. The right-angling of the object W by the respective units 50A to 50C will be simply described as follows.

Figure 26:
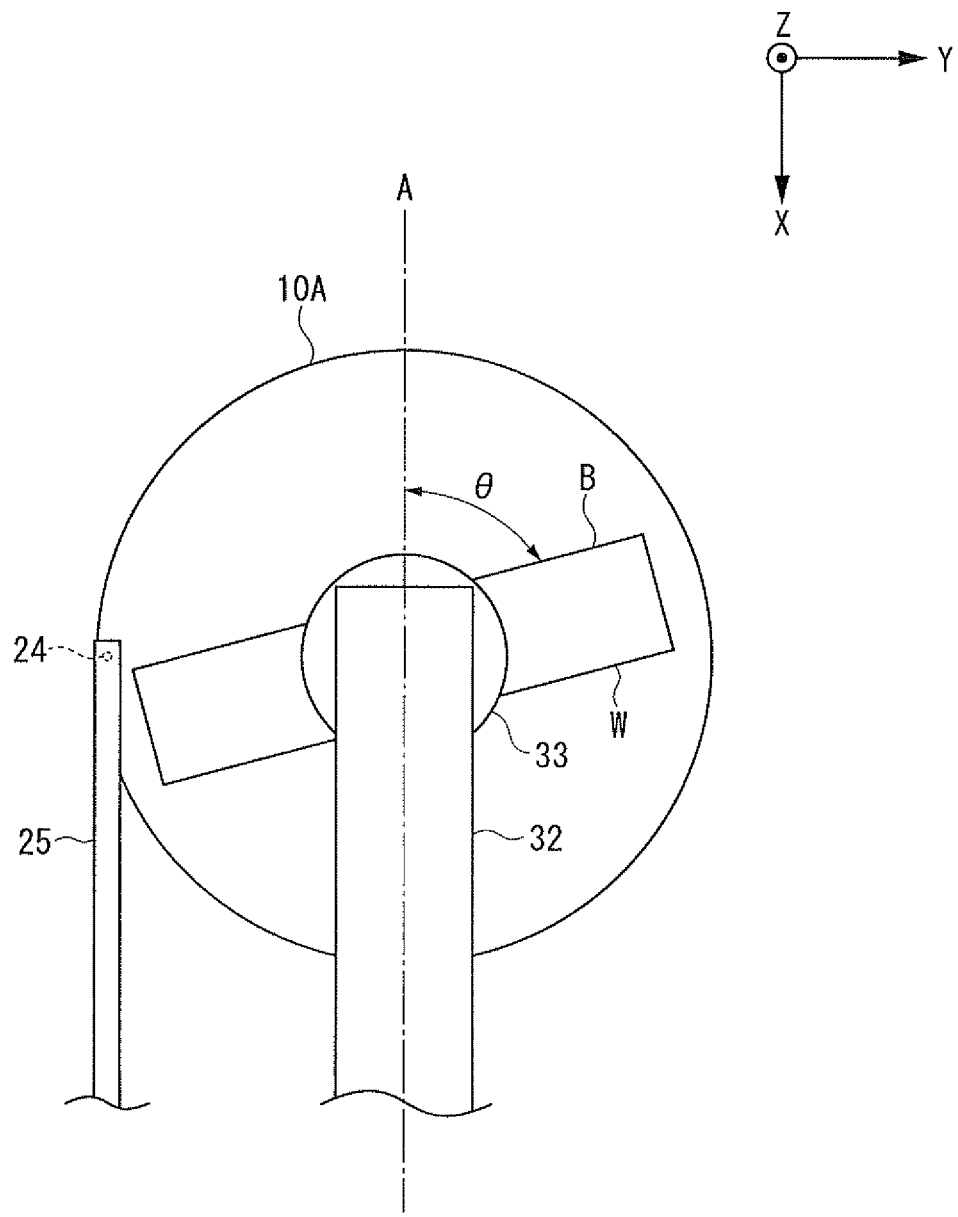
FIG. 26 is a plan view showing the image probe that captures an image of the object.

FIG. 26 is a plan view showing the image probe 30 that captures the object W.

Firstly, the image probe control unit 50A captures the image of the object W by the image probe 30 (the image capture step S1). Next, the inclination angle calculating unit 50B calculates the inclination angle $\theta$ of the object W relative to the measurement axis A based on the captured image of the object W (the inclination angle calculation step S2).

Figure 27:
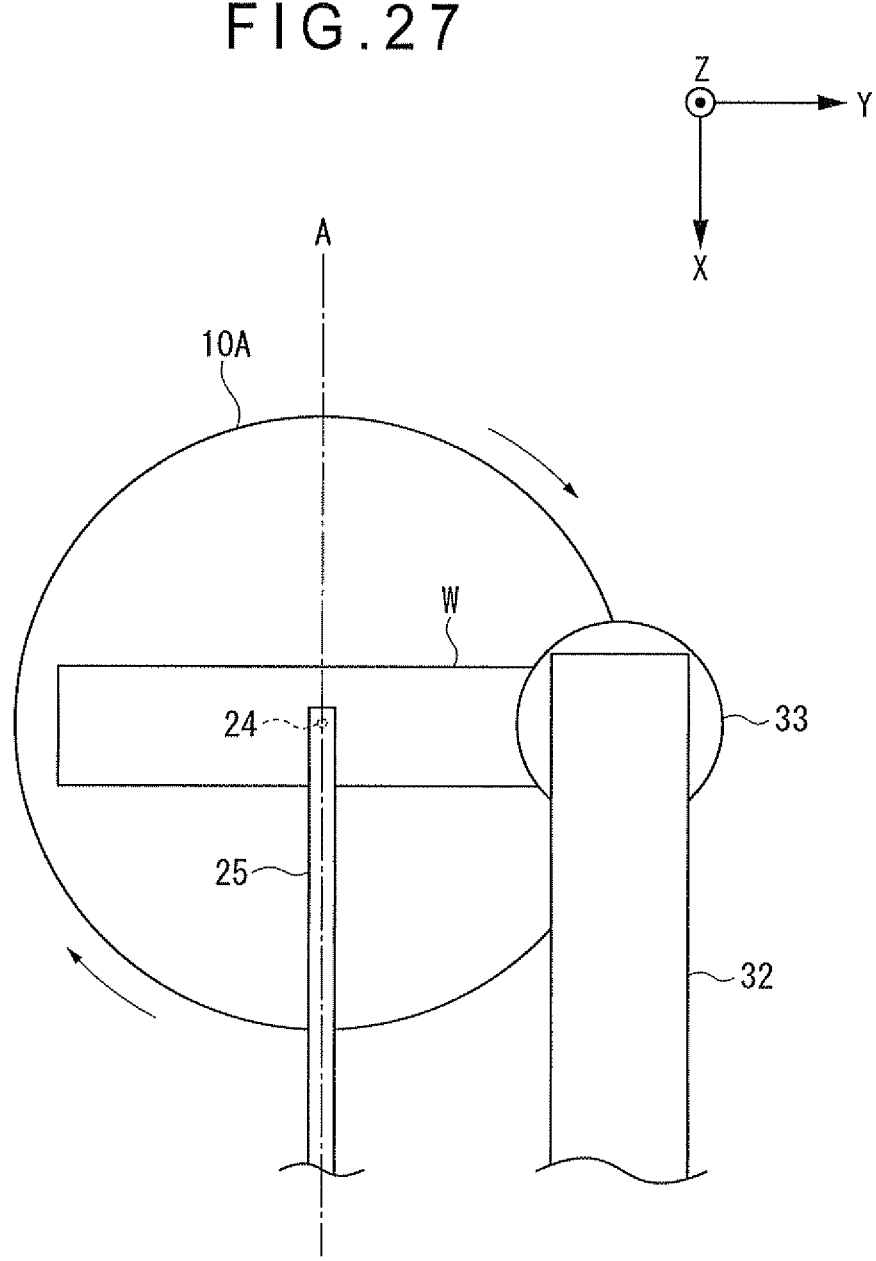
FIG. 27 is a plan view showing an attitude adjustment of the object by the attitude adjusting unit.

FIG. 27 is a plan view showing an attitude adjustment of the object W by the attitude adjusting unit 50C.

The attitude adjusting unit 50C rotates the turntable 10A based on the inclination angle $\theta$ and adjusts the attitude of the object W perpendicular to the measurement axis A (the adjustment step S3). Thus, the right-angling is completed. Subsequently, the controller 50 moves the stylus 24 along the measurement axis A, thereby measuring the surface texture of the object W along a direction perpendicular to the axial direction.

Advantages of Second Exemplary Embodiment

According to the second exemplary embodiment, what is carried out in the preliminary measurement is only that the image probe 30 captures the image of the object W to calculate the inclination angle $\theta$ of the object W relative to the measurement axis A. Accordingly, the number of the steps in the preliminary measurement can be decreased, thereby shortening the time for the preliminary measurement. Moreover, since the measurement is carried out by the image probe 30, the measurement time can be shortened as compared with the measurement by the stylus 24. Consequently, the time for the preliminary measurement can be considerably shortened.

Further, since the preliminary measurement is a noncontact measurement by the image probe 30, the object W is not damaged.

Modification(s) of Second Exemplary Embodiment

A table mounted on the stage is not limited to the table shown in FIG. 20.

Figure 28:
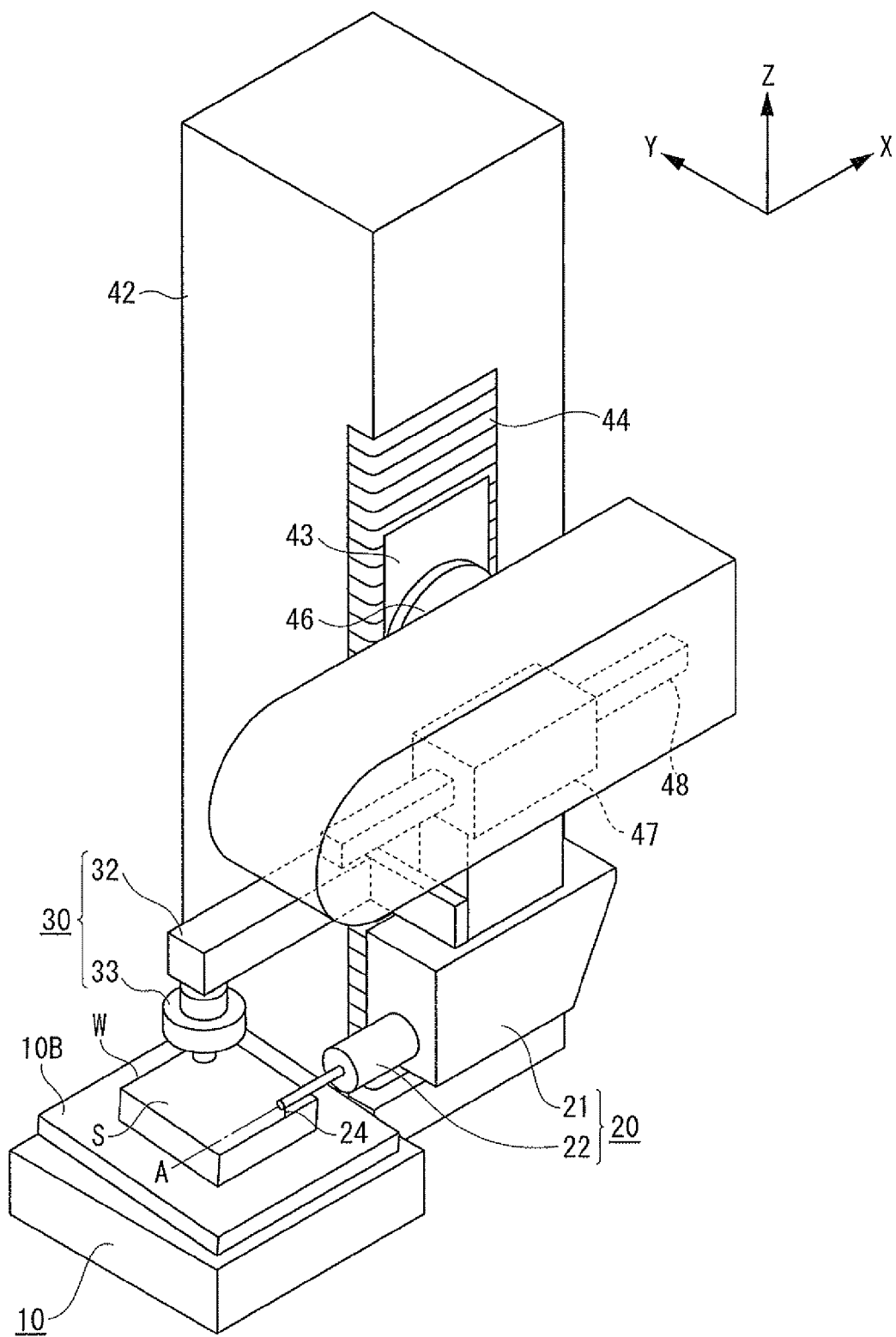
FIG. 28 is a perspective view showing the surface texture measuring machine according to the second exemplary embodiment of the invention in which a turntable is replaced with a leveling table.

For instance, the surface texture measuring mechanism as shown in FIG. 28 may be provided with a leveling table 10B in place of the turntable 10A.

Figure 29:
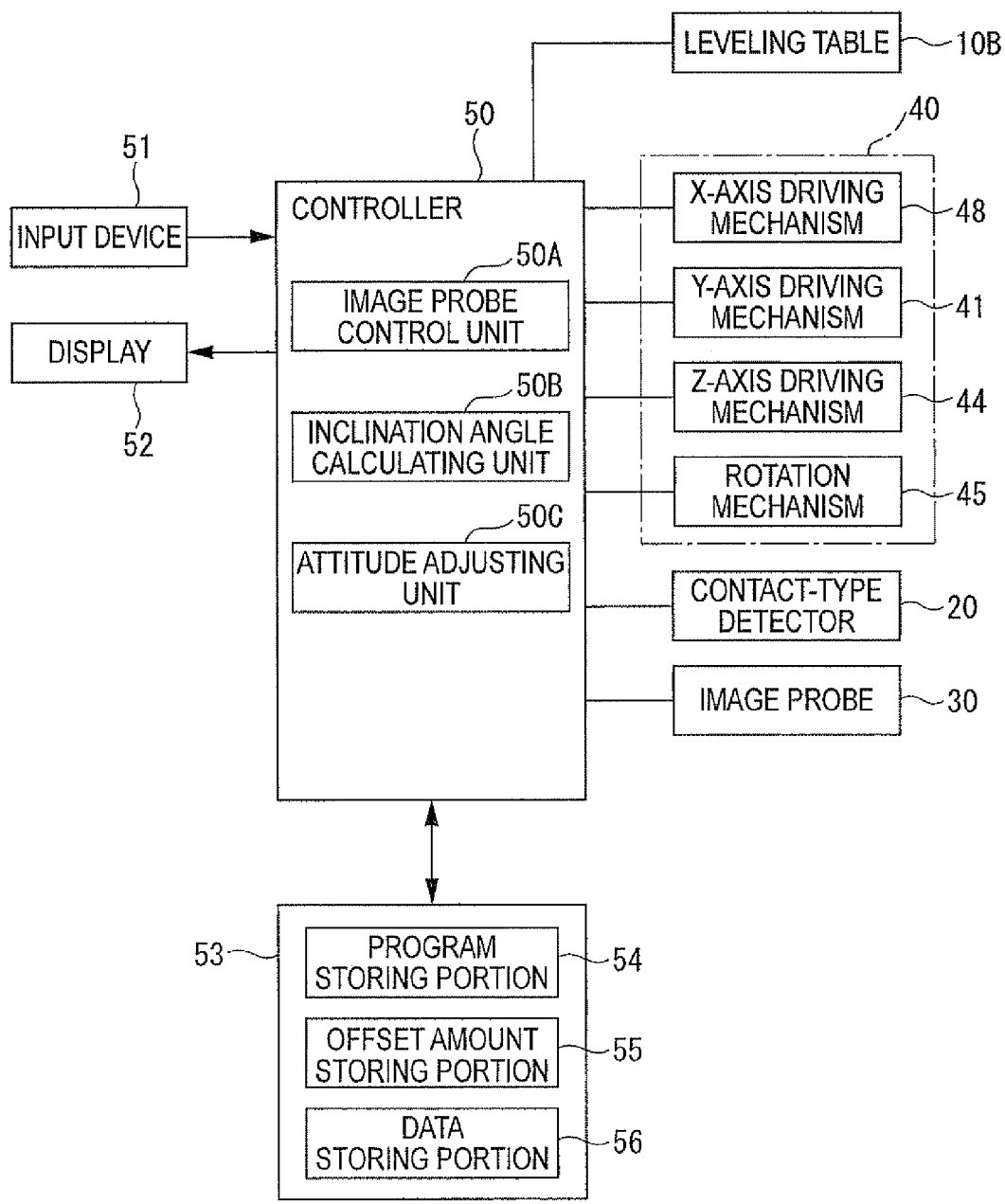
FIG. 29 is a block diagram showing a controller of the surface texture measuring machine shown in FIG. 28.

On the leveling table 10B shown in FIG. 28, a rectangular parallelepiped object W is mounted. The leveling table 10B inclines the object W relative to a horizontal plane which is a reference plane perpendicular to a displacing direction (vertical direction) of the stylus 24. In advance of the actual measurement, the respective units 50A to 50C of the controller 50 shown in FIG. 29 perform a so-called leveling by which the attitude of the object W is adjusted so as to horizontalize a to-be-measured surface S.

Figure 30:
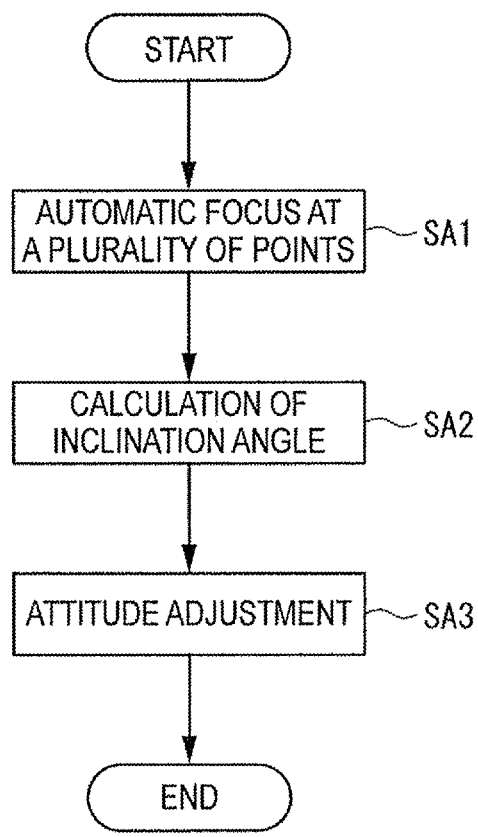
FIG. 30 is a flow chart for showing an attitude adjustment method by the surface texture measuring machine shown in FIG. 28.
Figure 31A:
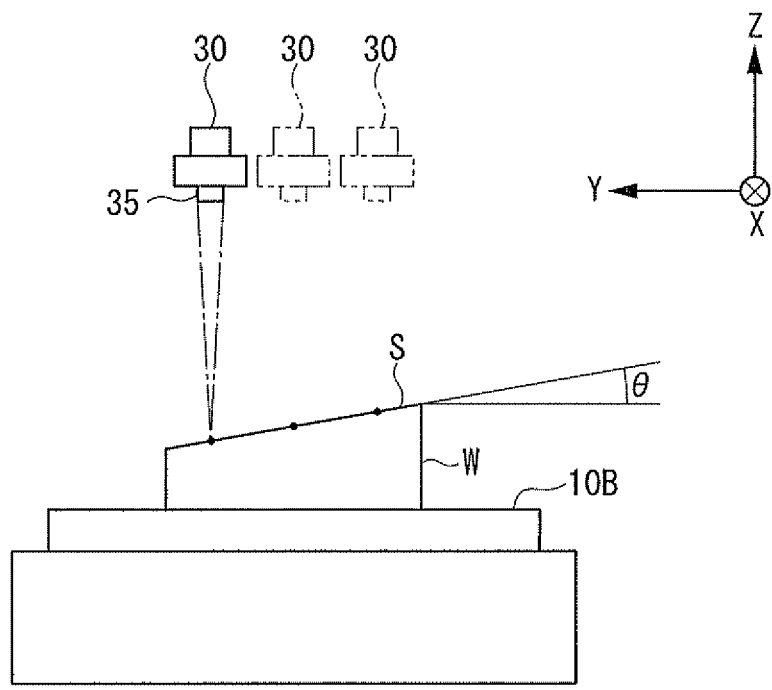
FIG. 31A is a side elevation of the leveling table of the surface texture measuring machine shown in FIG. 28 during operation.
Figure 31B:
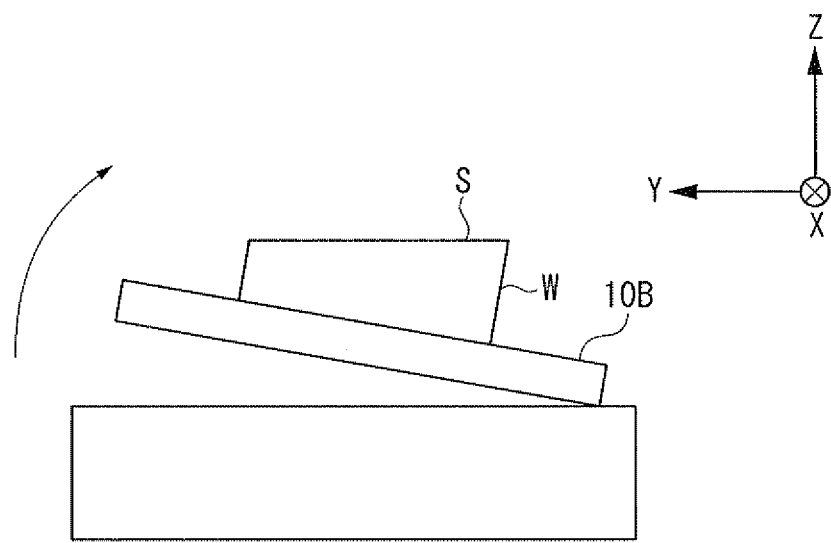
FIG. 31B is a side elevation of the leveling table of the surface texture measuring machine shown in FIG. 28 during operation.

The leveling of the object W by the respective units 50A to 50C will be briefly explained with reference to the flow chart in FIG. 30 and the side elevations showing movement of the leveling table 10B in FIGS. 31A and 31B. FIG. 31A shows the leveling table 10B that is horizontally situated. FIG. 31B shows the leveling table 10B inclined at an angle where the to-be-measured surface S is horizontal.

Firstly, as shown in FIG. 31A, the operator controls the relative movement mechanism 40 via the input device 51 and moves the image probe 30 above points (for instance, three points) of the to-be-measured surface S. At each of the points, the image probe control unit 50A moves the image probe 30 in a vertical direction by the relative movement mechanism 40 so that the each of the points is positioned at the focal point of the objective lens 35 (a focusing step SA1). At this time, a height of the image probe 30 at the each of the points is detected by a sensor (not shown) provided in the Z-axis driving mechanism 44. In this arrangement, the image probe control unit 50A is a focusing unit.

After the step SA1, the inclination angle calculating unit 50B calculates the inclination angle $\theta$ of the to-be-measured surface S relative to the horizontal plane based on the height of the image probe 30 at the each of the points of the to-be-measured surface S (an inclination angle calculation step SA2).

After the step SA2, as shown in FIG. 31B, the attitude adjusting unit 50C rotates the leveling table 10B based on the inclination angle $\theta$ and adjusts the attitude of the object W so that the to-be-measured surface S thereof is horizontal (the adjustment step SA3). Thus, the leveling is completed. Subsequently, the controller 50 moves the stylus 24 along the measurement axis A, thereby measuring the surface texture of the object W. It should be noted that the leveling table 10B is schematically shown in FIGS. 28 and 31 and is rotatable in a counterclockwise direction.

Even with the above arrangement, what is carried out in the preliminary measurement is only that the image probe 30 is automatically focused at each of the points of the to-be-measured surface S and the inclination angle θ of the to-be-measured surface S relative to the horizontal plane based on the height of the image probe 30 is calculated at each of the points. Accordingly, the number of the steps in the preliminary measurement can be reduced. Moreover, since the measurement is carried out by the image probe 30, the measurement time can be considerably shortened as compared with a typical measurement by the stylus 24. Further, since the preliminary measurement is a noncontact measurement by the image probe 30, the object W is not damaged.

In this exemplary embodiment, a profile of the object of which attitude is adjustable is not limited to the above-mentioned profile. In this exemplary embodiment, an attitude of the object having any profile is adjustable. Further, the surface texture measuring machine according to the exemplary embodiment may include a table functioning as the turntable and the leveling table, by which the surface texture measuring machine according to the exemplary embodiment adjusts the attitude of the object in parallel to the measurement axis and adjusts the to-be-measured surface so that the to-be-measured surface is horizontal.

Third Exemplary Embodiment

It should be noted that components which are identical or correspond to those of the first exemplary embodiment will be denoted by the same reference numerals, description of which will be omitted, for describing a third exemplary embodiment.

Figure 32:
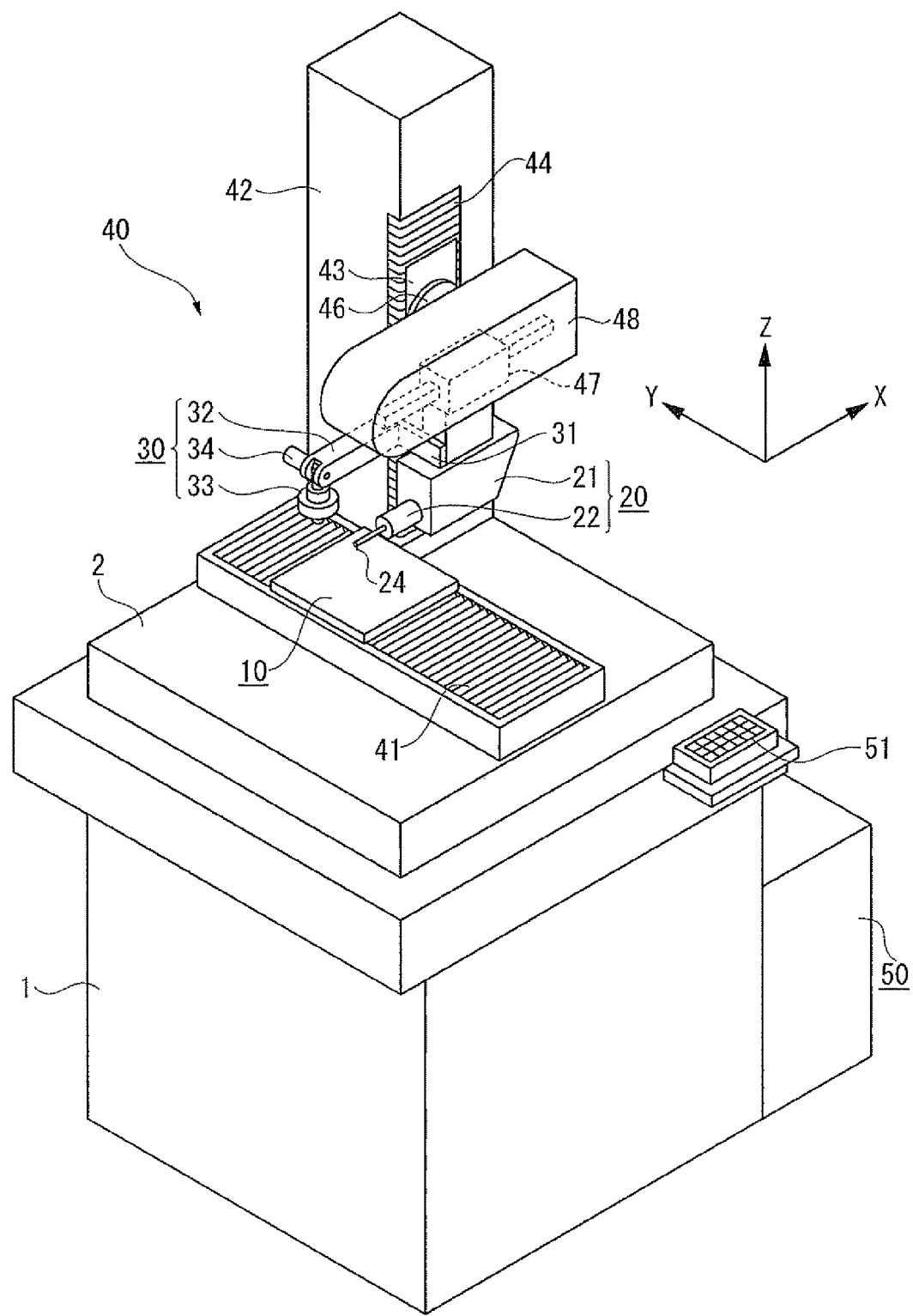
FIG. 32 is a perspective view showing a surface texture measuring machine according to a third exemplary embodiment of the invention.
Figure 33:
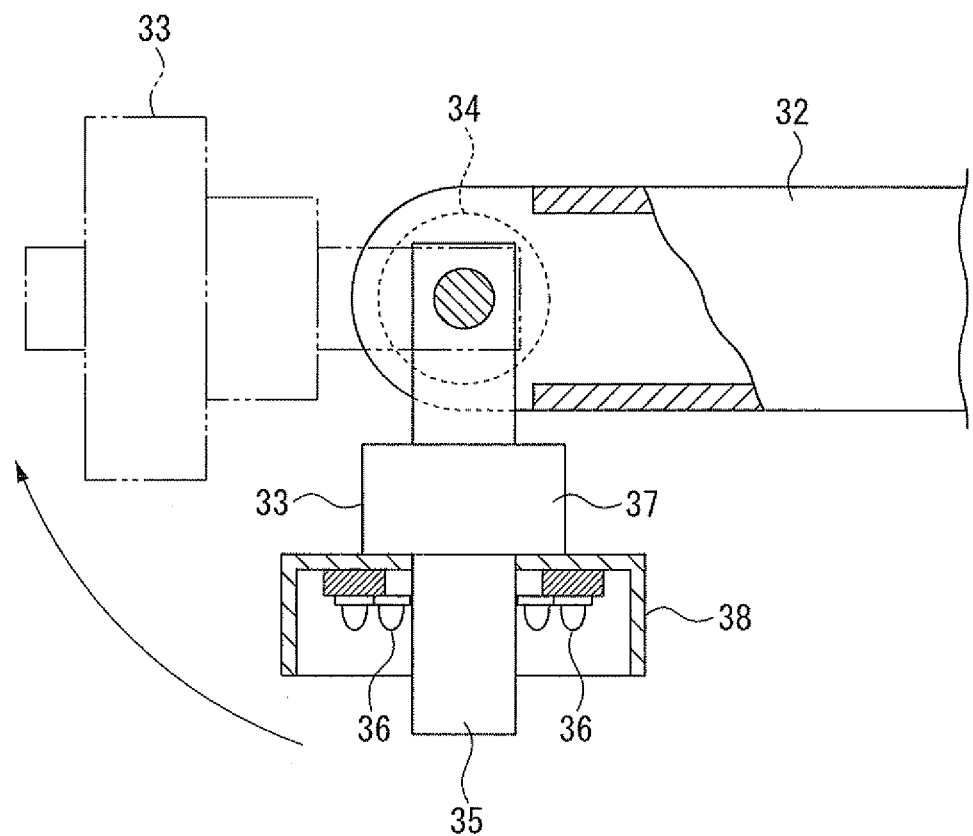
FIG. 33 shows an image probe according to the third exemplary embodiment.

A surface texture measuring machine according the third exemplary embodiment can automatically set a stylus of a contact-type detector at a measurement starting position of an object based on an image of the object captured by an image probe. As shown in FIGS. 32 and 33, the image probe 30 and the controller 50 are different in a structure from those of the surface texture measuring machine according the first exemplary embodiment.

The image probe 30 of the third exemplary embodiment includes: a cylindrical probe body 32 that is integrally connected to the X-slider 47 via the connecting member 31 along with the contact-type detector 20; and the probe head 33 that is rotatably supported around an axis (Y-axis) perpendicular to a direction (Y-axis direction) in which the contact-type detector 20 and the stage 10 relatively move and the displacing direction of the stylus 24 (Z-axis direction: vertical direction) while the stylus 24 is in contact with the object, the probe head 33 being provided at a tip end of the probe body 32; and a head turning mechanism 34 such as a motor for rotating the probe head 33.

The controller 50 according to the third exemplary embodiment includes: a movement course calculating unit that, when the measurement starting position is designated based on the image of the object captured by the image probe 30 in accordance with the measurement program stored in the program storing portion 54, calculates and stores the movement course of the relative movement mechanism 40 so that the stylus 24 of the contact-type detector 20 is brought into contact with the measurement starting position on the object; a stylus setting unit that drives the relative movement mechanism 40 along the movement course calculated by the movement course calculating unit; and a measurement performing unit that operates the relative movement mechanism 40 so that the contact-type detector 20 is moved relative to the object while the stylus 24 of the contact-type detector 20 is in contact with the object, thereby measuring the surface profile of the object.

The controller 50 further includes an edge detection function for detecting the edge of the object in the image of the object captured by the image probe 30, and an auto-focusing function for displacing the objective lens 35 in the heightwise direction of the object (Z-axis direction) so that the focal point of the objective lens is set at the surface of the object defined in the heightwise direction to detect the heightwise position of the object depending on the displacement amount of the objective lens 35. The edge detection function may be based on any known principle of detection but may use, for instance, a technique in which an average intensity (light intensity) in a direction perpendicular to the detection direction of the image probe 30 is obtained to detect a position at which the average intensity becomes equal to or below a preset threshold as the edge.

<Description of Measuring Method (see FIGS. 34 to 37)>

Figure 34:
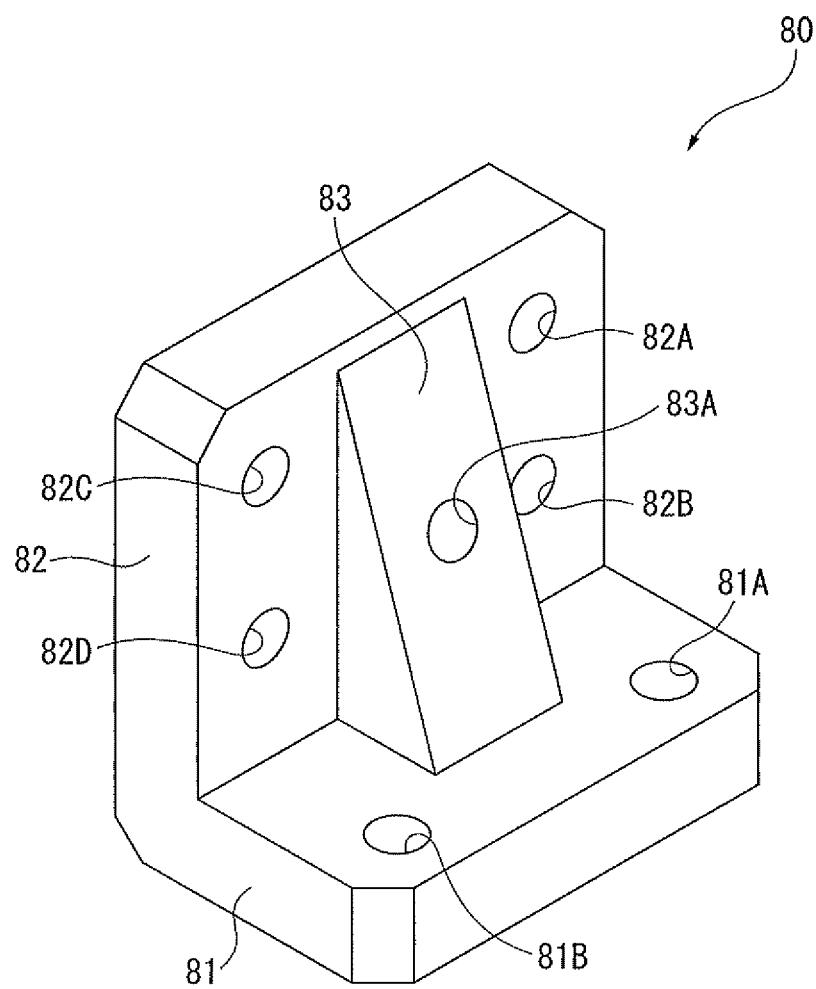
FIG. 34 shows an object to be measured according to the third exemplary embodiment.

For instance, a measurement of an object 80 shown in FIG. 34 will be described.

The object 80 includes: a horizontal wall 81; a vertical wall 82 perpendicularly erected at one end of the horizontal wall 81; and an inclined wall 83 formed in an inclined manner between the horizontal wall 81 and the vertical wall 82. Four holes 82A to 82D are formed on both ends of the vertical wall 82 interposing the inclined wall 83. Two holes 81A and 81B are formed on both ends of the horizontal wall 81. A hole 83A is formed at a center of the inclined wall 83 in a manner perpendicular to the inclined wall 83.

Example of Profile Measurement of Holes 82A to 82D on Vertical Wall 82

Figure 35A:
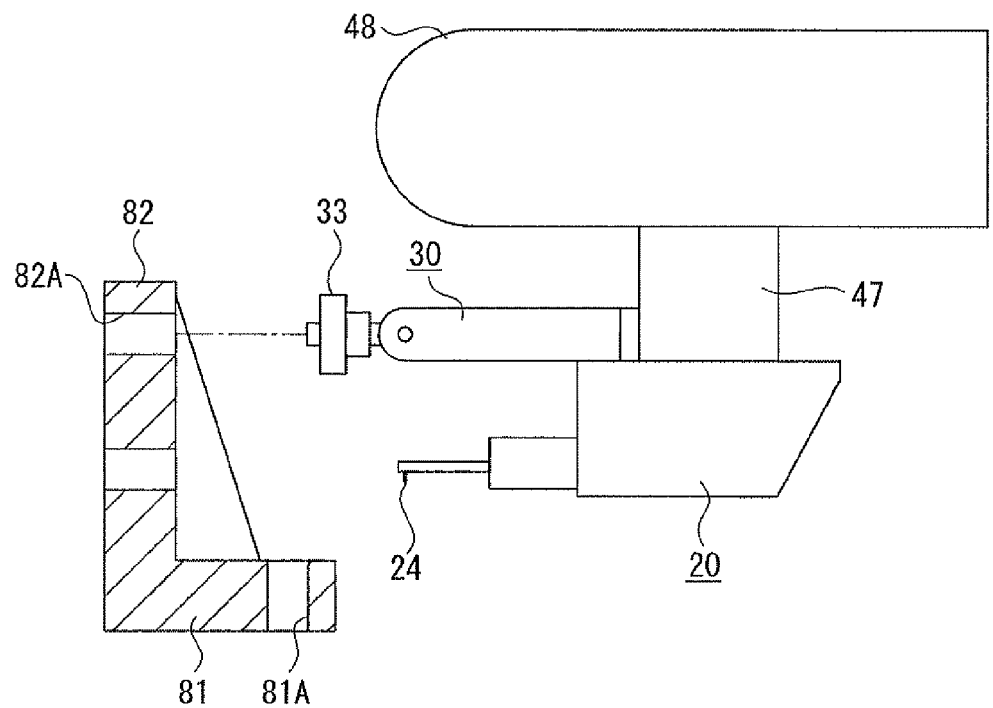
FIG. 35A is an illustration showing a measurement of a hole of a vertical wall by the surface texture measuring machine according to the third exemplary embodiment.

Firstly, as shown in FIG. 35A, the probe head 33 of the image probe 30 is held in a horizontal attitude by a command of the input device 51, In this state, the image probe 30 captures an image of the vertical wall 82 of the object 80. The image data of the vertical wall 82 of the object 80 is stored in the data storing portion 56 and then is displayed on the display 52.

When a measurement starting position (a position at which the stylus 24 of the contact-type detector 20 is first brought into contact), for instance, a lower inner-circumferential surface of the hole 82A, is designated by using the input device 51 based on the image of the vertical wall 82 on the display 52, the controller 50 calculates the movement course of the relative movement mechanism 40 in consideration of the offset amounts OFx, OFy and OFz stored in the offset amount storing portion 55 so that the stylus 24 of the contact-type detector 20 is brought into contact with the lower inner-circumferential surface of the hole 82A on the object 80. The calculated movement course is stored in the program storing portion 54.

Figure 35B:
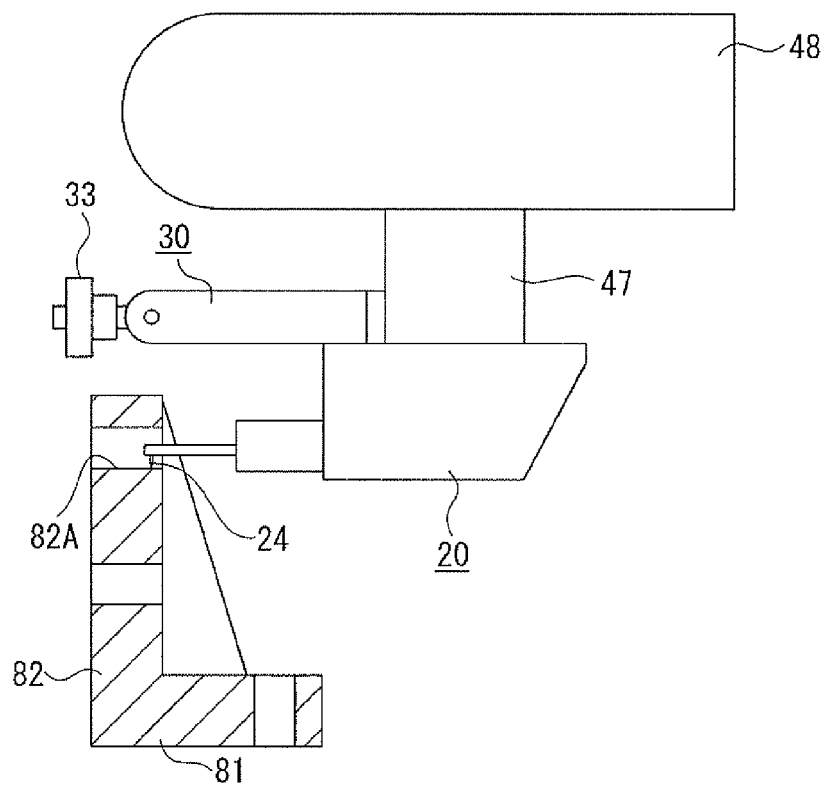
FIG. 35B is another illustration showing the measurement of the hole of the vertical wall by the surface texture measuring machine according to the third exemplary embodiment.

Subsequently, upon receiving a command for starting a measurement, the controller 50 operates the relative movement mechanism 40 in accordance with the movement course stored in the program storing portion 54. In other words, as shown in FIG. 35B, the controller 50 operates the relative movement mechanism 40 so that the stylus 24 of the contact-type detector 20 is brought into contact with the designated position (the lower inner-circumferential surface of the hole 82A).

When the stylus 24 of the contact-type detector 20 is set at the lower inner-circumferential surface of the hole 82A, the controller 50 operates the X-axis driving mechanism 48. Then, the stylus 24 of the contact-type detector 20 is moved from the designated position in the X-axis direction. With this movement, the stylus 24 is vertically displaced in accordance with the surface roughness of the object 80 in contact with the stylus 24 and the displacement amount of the stylus 24 is detected by the detecting portion 26. Consequently, the surface roughness of the hole 82A of the object 80 is measured according to the displacement amount and the movement amount of the stylus 24.

Example of Profile Measurement of Hole 83A on Inclined Wall 83

Figure 36A:
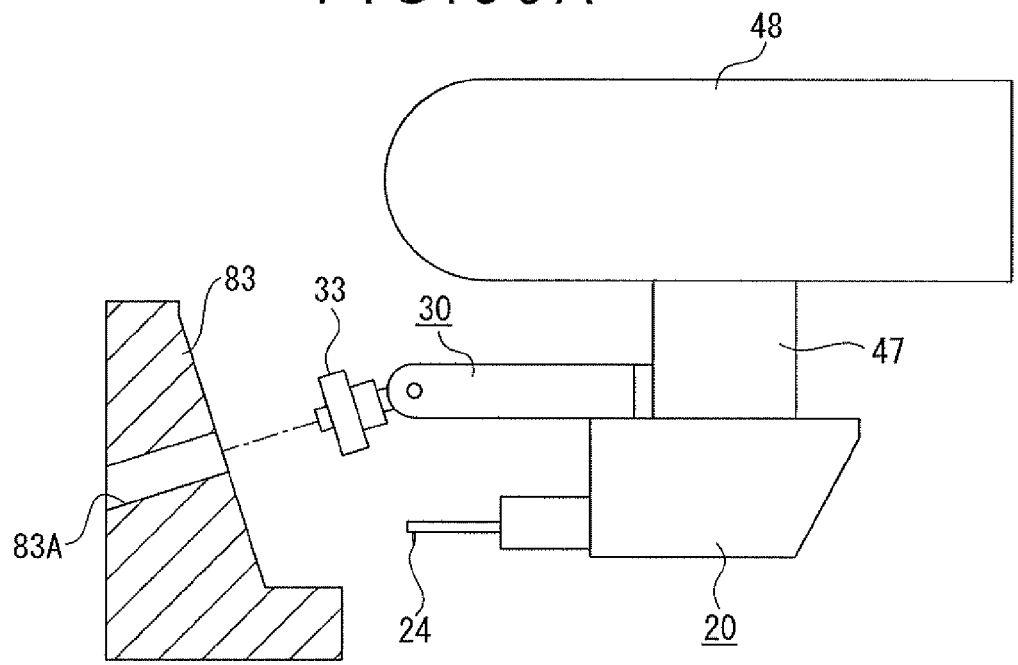
FIG. 36A is an illustration showing a measurement of a hole of an inclined wall by the surface texture measuring machine according to the third exemplary embodiment.

Firstly, as shown in FIG. 36A, the probe head 33 of the image probe 30 is rotated by a command of the input device 51 and is held in an attitude opposing the inclined wall 83. In this state, the image probe 30 captures an image of the inclined wall 83 of the object 80. Then, the image data of the inclined wall 83 of the object 80 is stored in the data storing portion 56 and then is displayed on the display 52.

When a measurement starting position, for instance, a lower inner-circumferential surface of the hole 83A, is designated by using the input device 51 based on the image of the inclined wall 83 displayed on the display 52, the controller 50 calculates the movement course of the relative movement mechanism 40 in consideration of the offset amounts OFz and OFy stored in the offset amount storing portion 55 so that the stylus 24 of the contact-type detector 20 is brought into contact with the lower inner-circumferential surface of the hole 83A on the object 80. The calculated movement course is stored in the program storing portion 54.

Figure 36B:
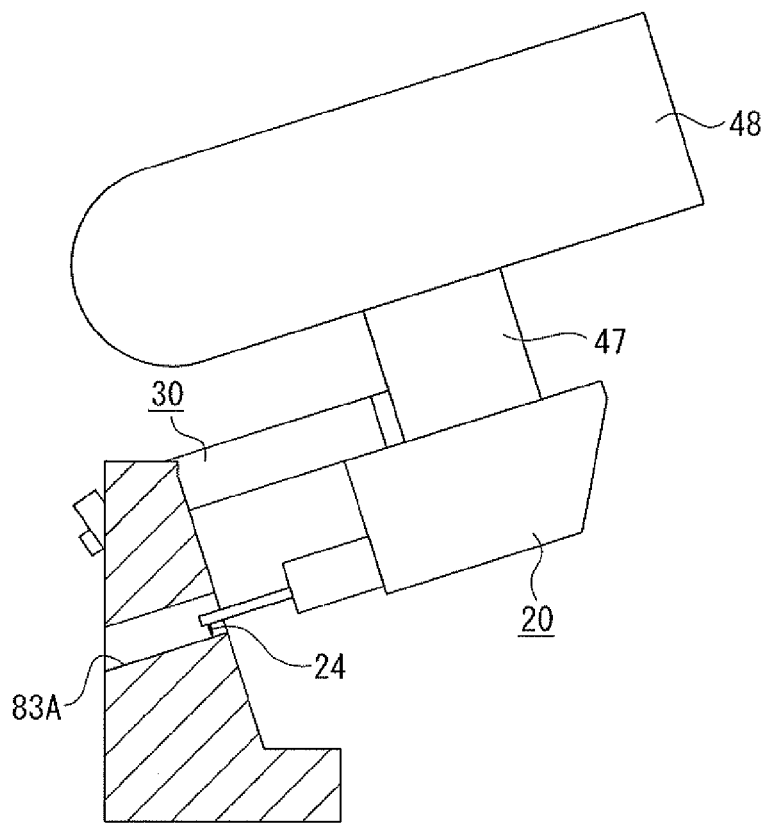
FIG. 36B is another illustration showing the measurement of the hole of the inclined wall by the surface texture measuring machine according to the third exemplary embodiment.

Subsequently, upon receiving a command for starting a measurement, the controller 50 operates the relative movement mechanism 40 in accordance with the movement course stored in the program storing portion 54. In other words, as shown in FIG. 36B, the controller 50 inclines the X-axis driving mechanism 48 by rotating the rotation mechanism 45, thereby aligning the inclination of the hole 83A with the moving direction of X-axis driving mechanism 48. Subsequently, the controller 50 operates the relative movement mechanism 40 so that the stylus 24 of the contact-type detector 20 is brought into contact with the designated lower inner-circumferential surface of the hole 83A.

When the stylus 24 of the contact-type detector 20 is set at the designated position, the controller 50 operates the X-axis driving mechanism 48. Then, the stylus 24 of the contact-type detector 20 is moved from the designated position in an axial direction of the hole 83A. With this movement, the stylus 24 is vertically displaced in accordance with the surface roughness of the object 80 in contact with the stylus 24 and the displacement amount of the stylus 24 is detected by the detecting portion 26. Consequently, the surface roughness of the hole 83A of the object 80 is measured according to the displacement amount and the movement amount of the stylus 24.

Example of Profile Measurement of Holes 81A and 8113 on Horizontal Wall 81

Figure 37:
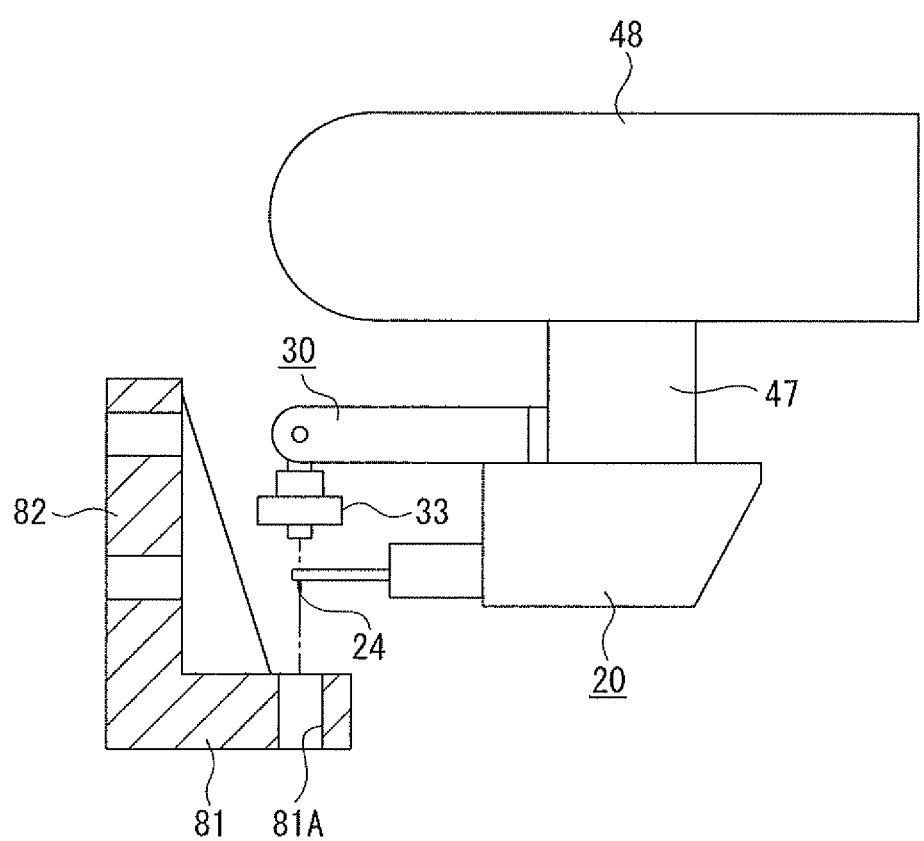
FIG. 37 is an illustration showing a measurement of a hole of a horizontal wall by the surface texture measuring machine according to the third exemplary embodiment.

Firstly, as shown in FIG. 37, the probe head 33 of the image probe 30 is rotated by a command of the input device 51 and is held in a downward attitude. In this state, when the image probe 30 captures an image of the horizontal wall 81 of the object 80, the image data of the horizontal wall 81 of the object 80 is stored in the data storing portion 56 and then is displayed on the display 52.

Here, the controller 50 executes processing on the image of the horizontal wall 81 of the object 80 stored in the data storing portion 56 to measure profiles and sizes of the holes 81A and 81B.

Advantages of Third Exemplary Embodiment

A surface texture measuring machine according to the third exemplary embodiment includes the contact-type detector 20 provided with the stylus 24 that is brought into contact with a surface of an object and the image probe 30 that captures an image of the surface of the object. With this arrangement, after the image probe 30 captures the image of the object, the stylus 24 of the contact-type detector 20 can be automatically brought into contact with a measurement position on the object based on the captured image of the object. Accordingly, the operator is not required to set a tip end of the stylus at a measurement starting position of the object while visually checking and adjusting the position of the tip end of the stylus relative to the measurement starting position as in a typical apparatus. Therefore, the stylus can be prevented from interfering with the object while reducing the burden on the operator.

The offset amounts OFz and OFy between the tip end of the stylus 24 of the contact-type detector 20 and the image probe 30 are stored in the offset amount storing portion 55. These offset amounts stored in the offset amount storing portion 55 are taken into consideration in calculating the movement course of the relative movement mechanism 40 so that the stylus 24 of the contact-type detector 20 is brought into contact with the measurement starting position on the object. Since the relative movement mechanism 40 is operated in accordance with this measurement course, the stylus 24 of the contact-type detector 20 can be accurately brought into contact with the measurement starting position on the object.

The image probe 30 includes: the cylindrical probe body 32 that is integrally connected to the X-slider 47 along with the contact-type detector 20; the probe head 33 that is rotatably supported around an axis in parallel to the Y-axis, the probe head 33 being provided at the tip end of the probe body 32; and the head turning mechanism 34 such as a motor for rotating the probe head 33. Accordingly, the downward attitude of the probe head 33 can be changed to the horizontal attitude thereof by the head turning mechanism 34.

Accordingly, the image of the vertical surface or any inclined surface as well as the horizontal surface of the object can be captured so that a profile of a hole or a protrusion provided on such surfaces can be measured by the contact-type detector 20.

What is claimed is:

1. A surface texture measuring machine for measuring a surface texture of an object, comprising:
    a stage on which the object is mounted;
    a contact-type detector having a stylus that is brought into contact with a surface of the object;
    an image probe that captures an image of the surface of the object;
    a relative movement mechanism that relatively moves the stage against the contact-type detector and the image probe and/or relatively moves the contact-type detector and the image probe against the stage; and
    a controller that controls a drive of the relative movement mechanism and executes processing on measurement data obtained by the contact-type detector and image data captured by the image probe,
    the controller including:
    a center position calculating unit that, when the image probe enters position data of at least three points on a circular contour of a circular concave portion or a circular convex portion of the object, approximates the entered position data to a circle to obtain a center position of the circle; and
    a stylus setting unit that, when the center position calculating unit obtains the center position, operates the relative movement mechanism to position the stylus of the contact-type detector at the center position, wherein:

one of the stylus of the contact-type detector and the image probe is located at an offset position not to interfere with the other of the stylus of the contact-type detector and the image probe that is used for a measurement, the surface texture measuring machine includes an offset amount storage unit that stores an offset amount of a tip end of the stylus of the contact-type detector and the image probe, and when the center position is obtained by the center position calculating unit, the stylus setting unit operates the relative movement mechanism to position the image probe at the center position and then operates the relative movement mechanism by the offset amount stored in the offset amount storage unit to position the stylus of the contact-type detector at the center position.

2. The surface texture measuring machine according to claim 1, wherein the controller further includes a movement course calculating unit that, when a measurement starting position on the object is designated based on the image of the object captured by the image probe, calculates and stores a movement course of the relative movement mechanism so that the stylus of the contact-type detector is brought into contact with the measurement starting position on the object, wherein the stylus setting unit operates the relative movement mechanism to follow the movement course calculated by the movement course calculating unit.

3. The surface texture measuring machine according to claim 2, wherein the image probe includes a probe body and a probe head that is supported at a tip end of the probe body and is capable of capturing the image of the object, the probe head being attached to the probe body in a manner to be rotatable around an axis perpendicular to a direction of the relative movement of the contact-type detector and the stage and a displacing direction of the stylus when the stylus is in contact with the object.

4. A surface texture measuring method for measuring a surface texture of an object having a circular concave portion or a circular convex portion by using a surface texture measuring machine comprising: a stage on which the object is mounted; a contact-type detector having a stylus that is brought into contact with a surface of the object; an image probe that captures an image of the surface of the object; a relative movement mechanism that relatively moves the stage against the contact-type detector and the image probe and/or relatively moves the contact-type detector and the image probe against the stage; and a controller that controls a drive of the relative movement mechanism and executes processing on measurement data obtained by the contact-type detector and image data captured by the image probe, the surface texture measuring method comprising:

acquiring position data of at least three points on a circular contour of the circular concave portion or the circular convex portion of the object by the image probe by operating the relative movement mechanism;

approximating the position data to a circle to obtain a center position of the circle;

operating the relative movement mechanism to position the stylus of the contact-type detector at the center position; and measuring the surface texture of the circular concave portion or the circular convex portion of the object while relatively moving the stylus of the contact-type detector and the object by operating the relative movement mechanism after the stylus of the contact-type detector is positioned at the center position of the circular concave portion or the circular convex portion of the object, wherein:

one of the stylus of the contact-type detector and the image probe is located at an offset position not to interfere with the other of the stylus of the contact-type detector and the image probe that is used for a measurement, the surface texture measuring machine includes an offset amount storage unit that stores an offset amount of a tip end of the stylus of the contact-type detector and the image probe, and when the center position is obtained by the center position calculating unit, the stylus setting unit operates the relative movement mechanism to position the image probe at the center position and then operates the relative movement mechanism by the offset amount stored in the offset amount storage unit to position the stylus of the contact-type detector at the center position.

* * * * *